（12） United States Patent
Chang et al.

(10) Patent No.: US 12,309,510 B2
(45) Date of Patent: May 20, 2025

(54) LIGHT-ADJUSTING DEVICE AND SOLID-STATE IMAGE SENSOR USING THE SAME

(71) Applicant: VisEra Technologies Company Limited, Hsin-Chu (TW)

(72) Inventors: Kai-Hao Chang, Hsin-Chu (TW);
Chun-Yuan Wang, Hsin-Chu (TW);
Shin-Hong Kuo, Hsin-Chu (TW);
Zong-Ru Tu, Hsin-Chu (TW);
Po-Hsiang Wang, Hsin-Chu (TW);
Chih-Ming Wang, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 154 days.

(21) Appl. No.: 17/962,120

(22) Filed: Oct. 7, 2022

(65) Prior Publication Data

US 2024/0121523 A1     Apr. 11, 2024

(51) Int. Cl.
*H04N 25/13*     (2023.01)

(52) U.S. Cl.
CPC ..... *H04N 25/134* (2023.01); *H04N 2209/045* (2013.01)

(58) Field of Classification Search
CPC ............ H04N 25/134; H04N 2209/045; H10F 39/8053; H10F 39/182; H10F 39/024; H10F 39/1825; H10F 39/806; H10F 39/8063; H10F 39/8067; H10F 39/807; G02B 1/002; G02B 1/14; G02B 3/08; G02B 3/0006; G02B 2003/0093; G02B 3/00; G02B 1/02
See application file for complete search history.

(56) References Cited

U.S. PATENT DOCUMENTS

| | | | |
|---|---|---|---|
| 2015/0311243 A1* | 10/2015 | Jin | H04N 25/134 |
| | | | 257/432 |
| 2020/0344430 A1* | 10/2020 | Wang | H04N 25/571 |
| 2021/0072439 A1* | 3/2021 | Cho | H10F 39/806 |
| 2021/0124179 A1* | 4/2021 | Yun | G02B 5/1876 |
| 2022/0141427 A1* | 5/2022 | Roh | H04N 25/702 |
| | | | 348/164 |
| 2022/0228918 A1 | 7/2022 | Busnaina et al. | |
| 2023/0044798 A1* | 2/2023 | Ahn | H01L 27/14621 |
| 2024/0079429 A1* | 3/2024 | Ahn | H01L 27/14621 |

FOREIGN PATENT DOCUMENTS

| | | |
|---|---|---|
| CN | 114200554 A | 3/2022 |
| KR | 10-2010-0018042 | 2/2010 |
| KR | 10-2020-0098490 | 8/2020 |
| KR | 10-2022-0058387 | 5/2022 |
| TW | I273285 B | 2/2007 |
| TW | 201740097 A | 11/2017 |

* cited by examiner

*Primary Examiner* — Lin Ye
*Assistant Examiner* — Tuan H Le
(74) *Attorney, Agent, or Firm* — MUNCY, GEISSLER, OLDS & LOWE, P.C.

(57) ABSTRACT

A light-adjusting device having first regions and second regions is provided. The light-adjusting device includes pillars that form several groups of meta structures. The groups of meta structures correspond to the first regions, and from a top view, the first regions and the second regions are arranged in a checkerboard pattern.

20 Claims, 27 Drawing Sheets

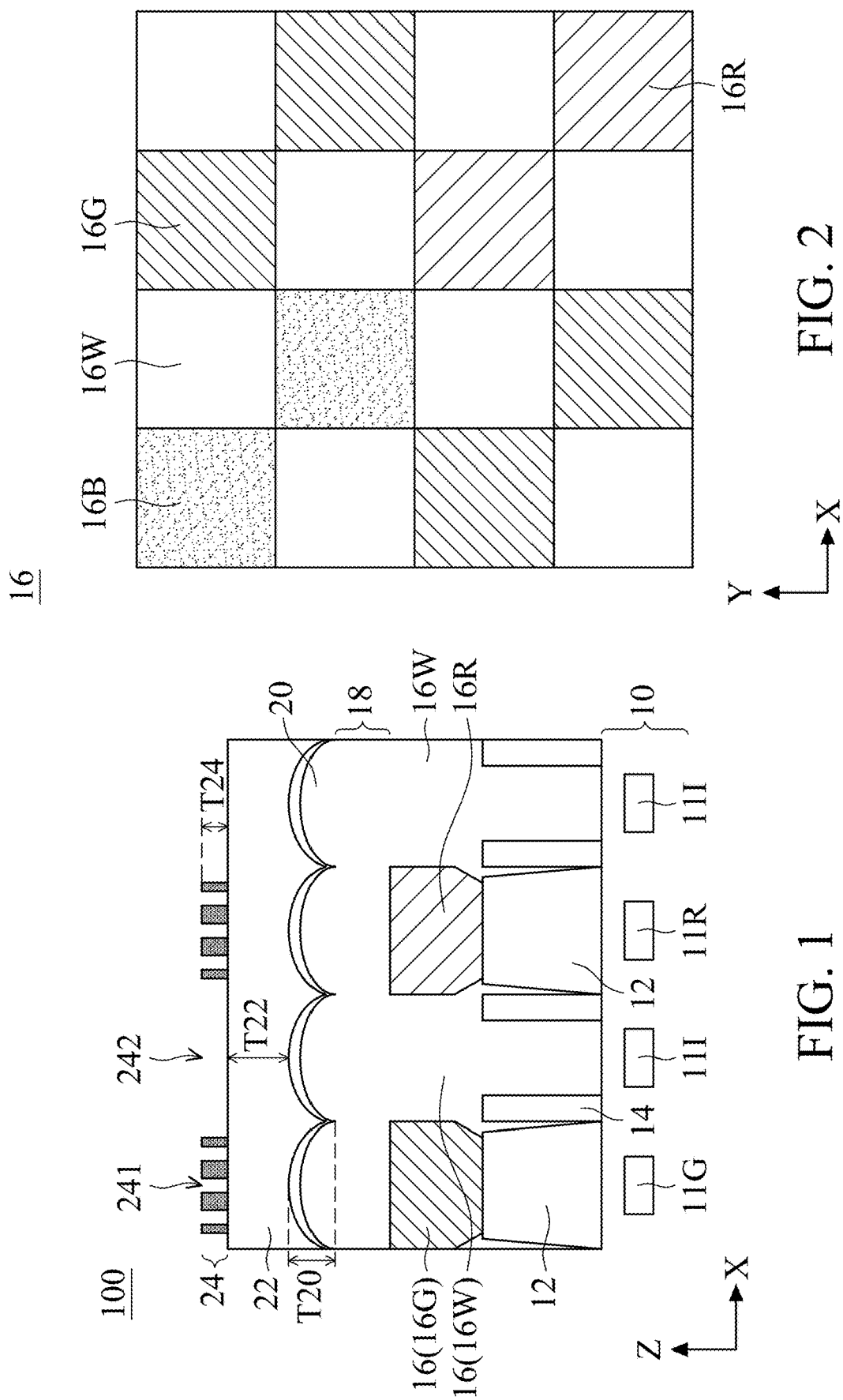

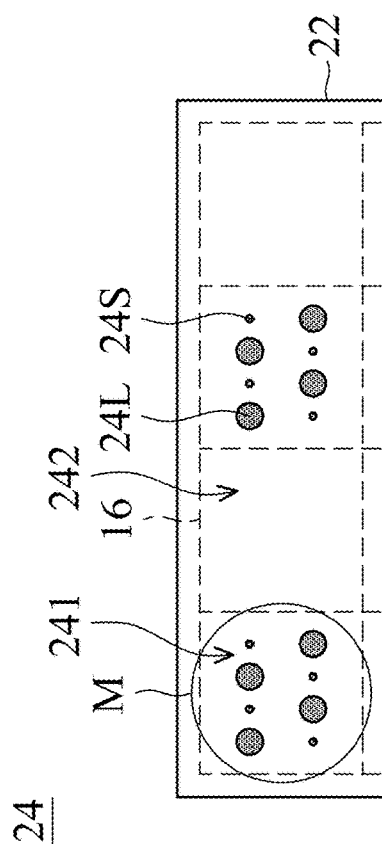
FIG. 3C
FIG. 3D

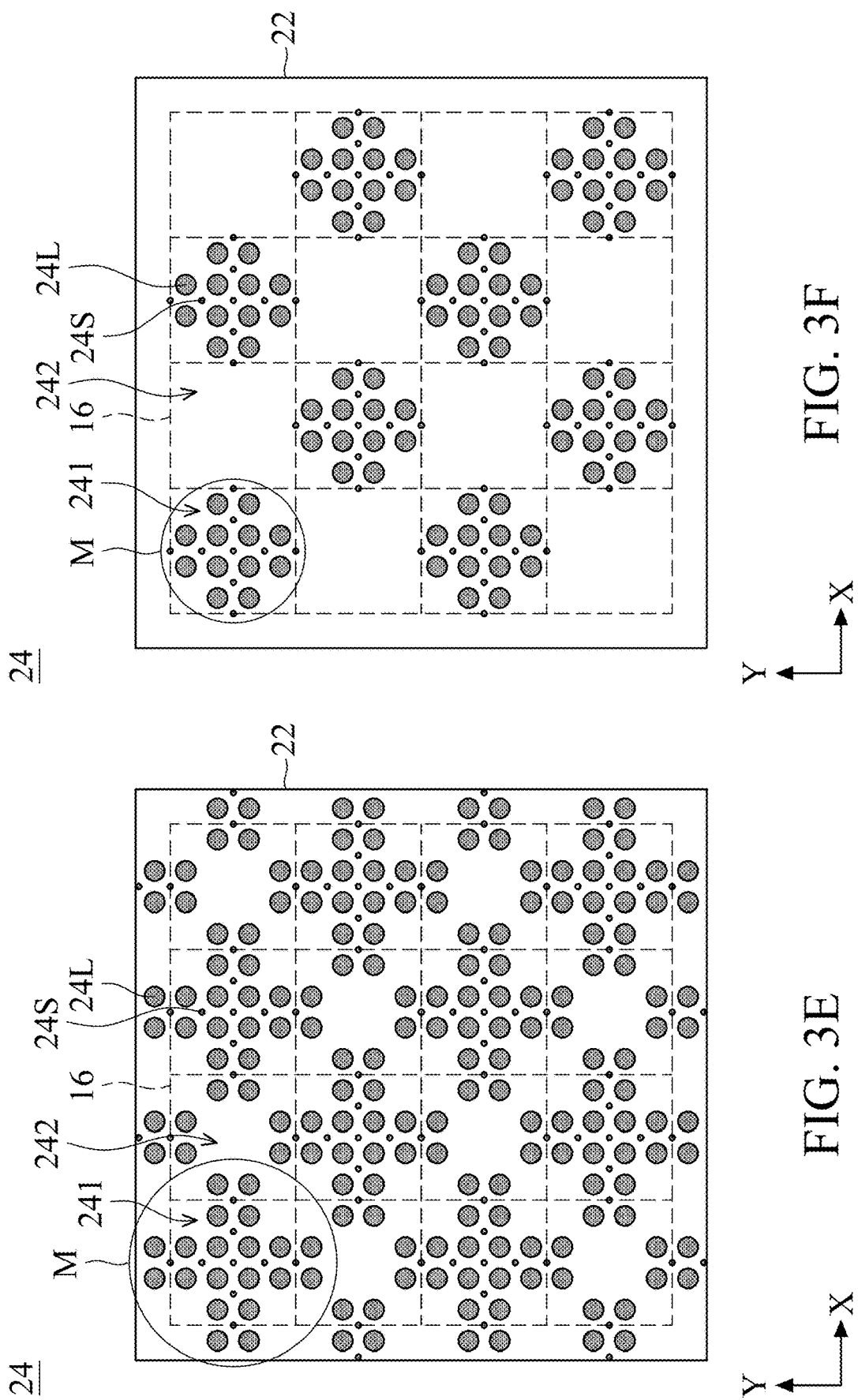

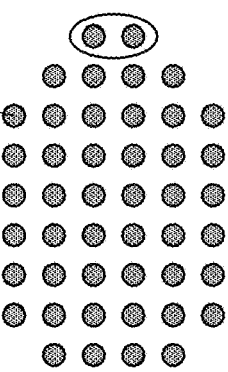
FIG. 6C
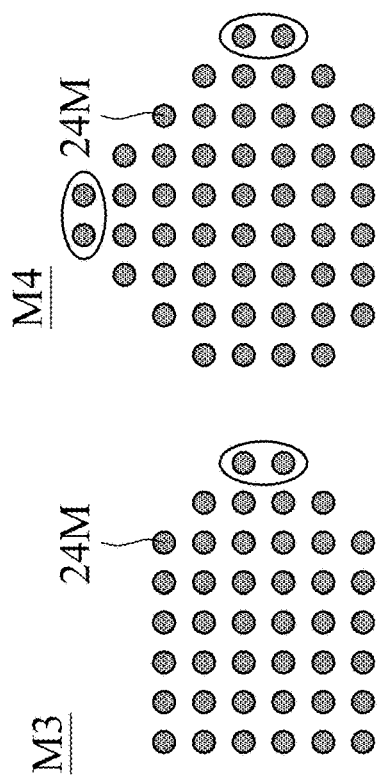
FIG. 6E
FIG. 6B
FIG. 6D
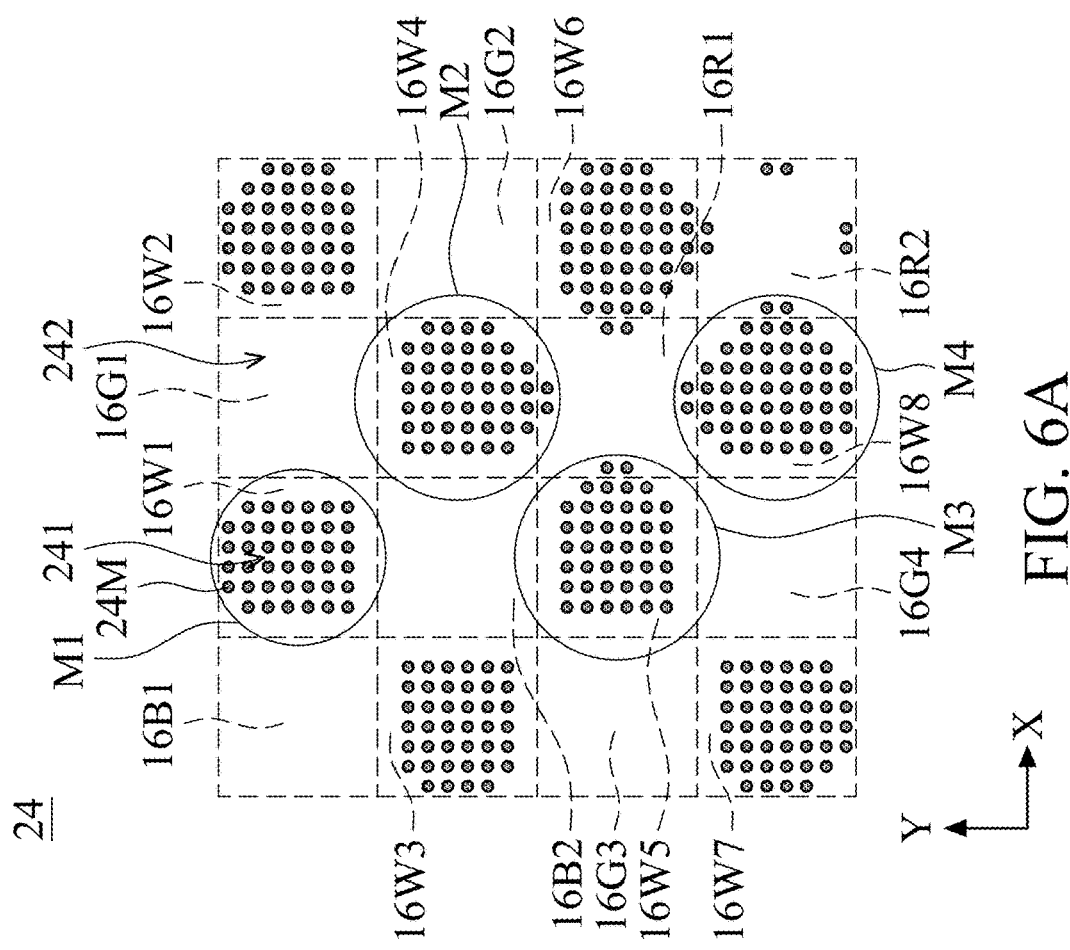
FIG. 6A

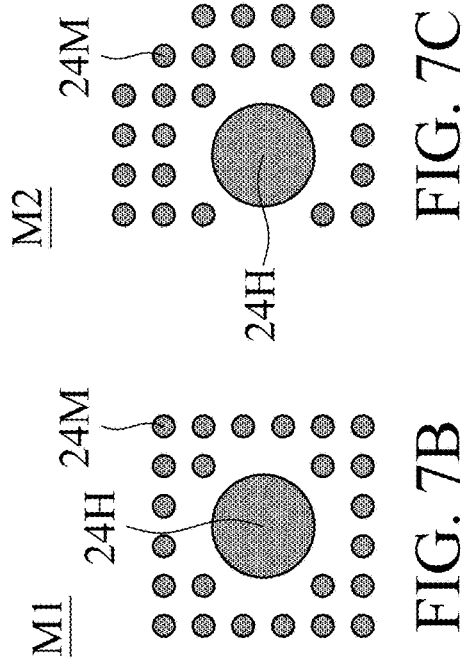
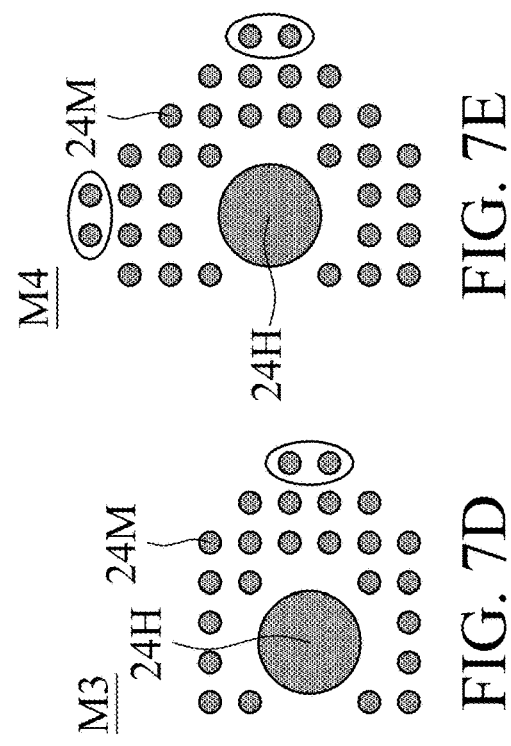
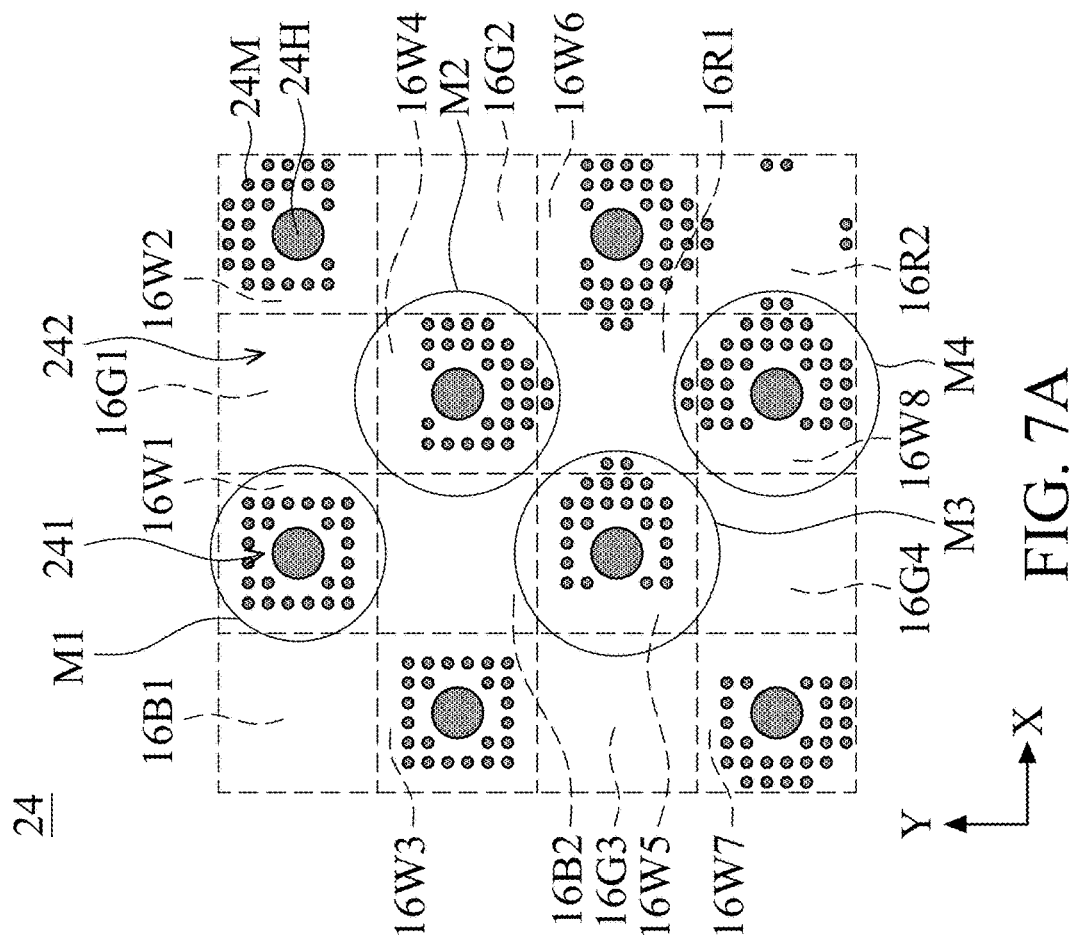

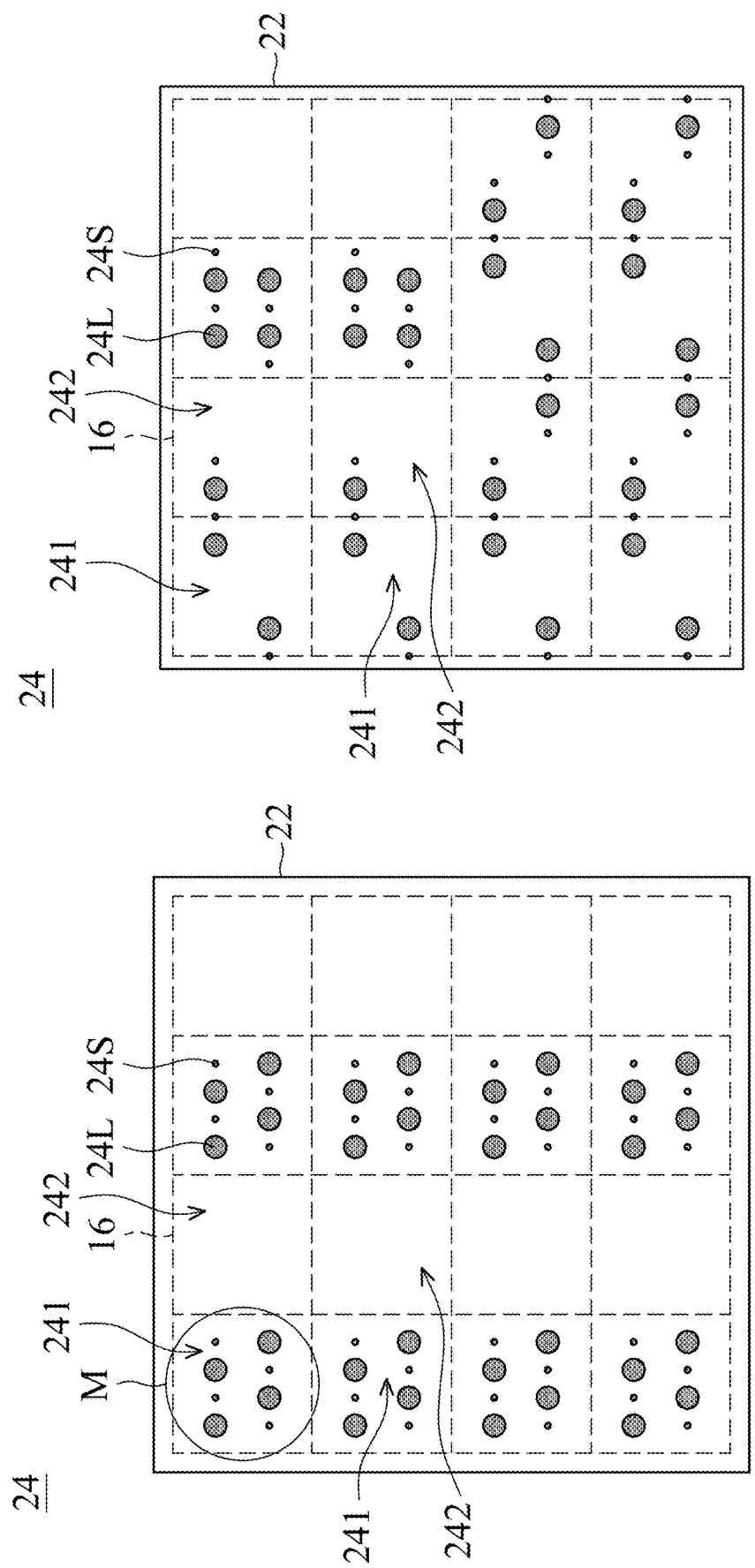

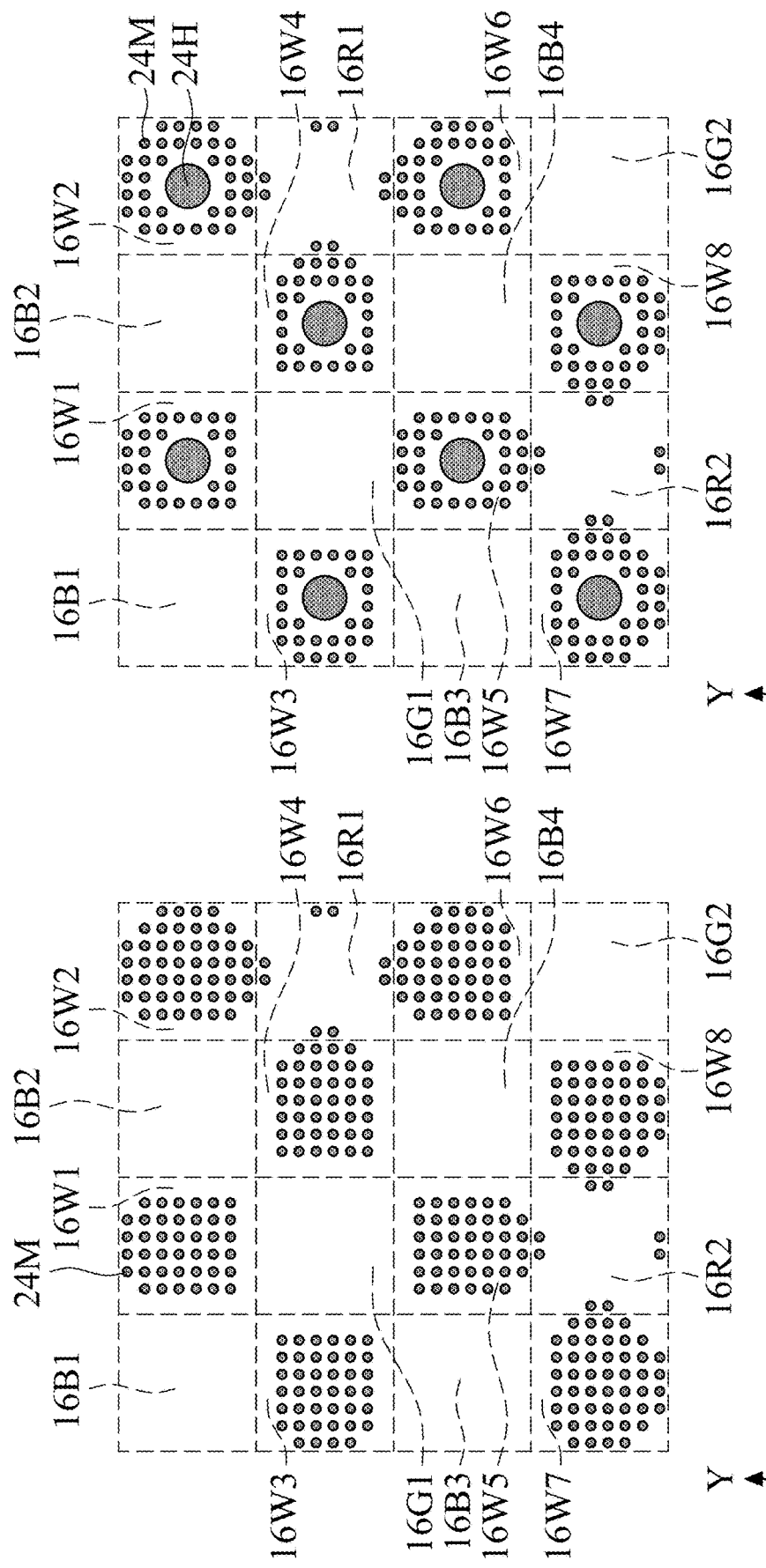

LIGHT-ADJUSTING DEVICE AND SOLID-STATE IMAGE SENSOR USING THE SAME

BACKGROUND

Field of the Invention

The embodiments of the present disclosure relate to a light-adjusting device, and in particular they relate to a light-adjusting device that includes regions arranged in a checkerboard pattern and a solid-state image sensor using the light-adjusting device.

Description of the Related Art

Solid-state image sensors (e.g., charge-coupled device (CCD) image sensors, complementary metal-oxide semiconductor (CMOS) image sensors, and so on) have been widely used in various image-capturing apparatuses such as digital still-image cameras, digital video cameras, and the like. The light sensing portion in the solid-state image sensor may be formed at each of pixels, and signal electric charges may be generated according to the amount of light received in the light sensing portion. In addition, the signal electric charges generated in the light sensing portion may be transmitted and amplified, whereby an image signal is obtained.

Although existing solid-state image sensors have been generally adequate for their intended purposes, they have not been entirely satisfactory in all respects. For example, the quantum efficiency in infrared (IR)/near infrared (NIR) are usually limited due to low absorption of silicon-based material. Although many alternative materials (e.g., Ge, GaAs or InGaAs) are used to enhance the light absorption, it still has space to improve the light utilization. Hence, a kind of methodology based on light harvesting is used for further improving. These technologies are significant in the application of Internet of things (IoT) and surveillance.

BRIEF SUMMARY

In some embodiments of the present disclosure, the light-adjusting device that includes regions arranged in a checkerboard pattern and the solid-state image sensor using the light-adjusting device are provided. The light-adjusting device may effectively enhance the IR/NIR signal and improve the quality of the color performance, thereby improving the quality of the image signal from the photoelectric conversion elements of the solid-state image sensors.

In accordance with some embodiments of the present disclosure, a light-adjusting device having first regions and second regions is provided. The light-adjusting device includes pillars that form several groups of meta structures. The groups of meta structures correspond to the first regions, and from a top view, the first regions and the second regions are arranged in a checkerboard pattern.

In some embodiments, the groups of meta structures have different pillar arrangements.

In some embodiments, the pillars are divided into first pillars and second pillars, and from a top view, the sectional area each first pillar is larger than the sectional area of each second pillar.

In some embodiments, in one group of meta structures, one first pillar and the closest second pillar define a first period, two adjacent second pillars define a second period, and the first period is greater than the second period.

In some embodiments, the number of pillars is different in each group of meta structures.

In some embodiments, some pillars correspond to the second regions.

In some embodiments, the first regions and the second regions are staggered in a first direction.

In some embodiments, the first regions and the second regions are staggered in a second direction that is perpendicular to the first direction.

In some embodiments, the first regions are adjacent to each other along a second direction that is perpendicular to the first direction, and the second regions are adjacent to each other along the second direction.

In some embodiments, the distance between two adjacent pillars in one groups of meta structure is variable.

In accordance with some embodiments of the present disclosure, a solid-state image sensor is provided. The solid-state image sensor includes photoelectric conversion elements and a color filter layer disposed above the photoelectric conversion elements. The color filter layer includes color filter segments and transparent segments. The solid-state image sensor also includes condensing structures disposed above the color filter layer. The solid-state image sensor further includes a light-adjusting device disposed above the condensing structures. The light-adjusting device has first regions and second regions and includes pillars that form several groups of meta structures. The groups of meta structures correspond to the first regions, and from a top view, the first regions and the second regions are arranged in a checkerboard pattern.

In some embodiments, the first regions are disposed on the color filter segments.

In some embodiments, the first regions are disposed on the transparent segments.

In some embodiments, some pillars correspond to the color filter segments.

In some embodiments, the color filter segments include red color filter segments, green color filter segments, and blue color filter segments, and some pillars correspond to the red color filter segments.

In some embodiments, the pillars form first groups of meta structures, second groups of meta structures, and third groups of meta structures that have different sizes of taper-adjacent-rectangular arrangement, and one of the second regions that corresponds to the blue color filter segment is surrounded by two of the first groups of meta structures, one of the second groups of meta structures, and one of the third groups of meta structures.

In some embodiments, the color filter segments and the transparent segments are staggered in a first direction.

In some embodiments, the color filter segments and the transparent segments are staggered in a second direction that is perpendicular to the first direction.

In some embodiments, the color filter segments are adjacent to each other along a second direction that is perpendicular to the first direction, and the transparent segments are adjacent to each other along the second direction.

In some embodiments, the pillars include a central pillar in one group of meta structures, and from a top view, the sectional area of the central pillar is larger than the sectional area of other pillars, and the central pillar corresponds to the center of the color filter segment or the transparent segment.

In some embodiments, the shortest distance between the condensing structure and the light-adjusting device is greater than the thickness of the light-adjusting device and the thickness of the condensing structure.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

FIG. 1 is a cross-sectional view illustrating a portion of the solid-state image sensor in accordance with some embodiments of the present disclosure.

FIG. 2 is a partial top view illustrating the color filter layer according to some embodiments of the present disclosure.

FIG. 3B, FIG. 3C, FIG. 3D, FIG. 3E, FIG. 3F, and FIG. 3G are partial top views illustrating the light-adjusting device according to some other embodiments of the present disclosure.

FIG. 6A is a partial top view illustrating the light-adjusting device according to some embodiments of the present disclosure.

FIG. 6B, FIG. 6C, FIG. 6D, and FIG. 6E are enlarged views of the groups of meta structures shown in FIG. 6A.

FIG. 7A is a partial top view illustrating the light-adjusting device according to some embodiments of the present disclosure.

FIG. 7B, FIG. 7C, FIG. 7D, and FIG. 7E are enlarged views of the groups of meta structures shown in FIG. 7A.

FIG. 9A, FIG. 9B, and FIG. 9C are partial top views illustrating the light-adjusting device according to some other embodiments of the present disclosure.

FIG. 12A is a partial top view illustrating the light-adjusting device according to some embodiments of the present disclosure.

FIG. 12B is a partial top view illustrating the light-adjusting device according to some embodiments of the present disclosure.

DETAILED DESCRIPTION OF THE INVENTION

Figure 3B:
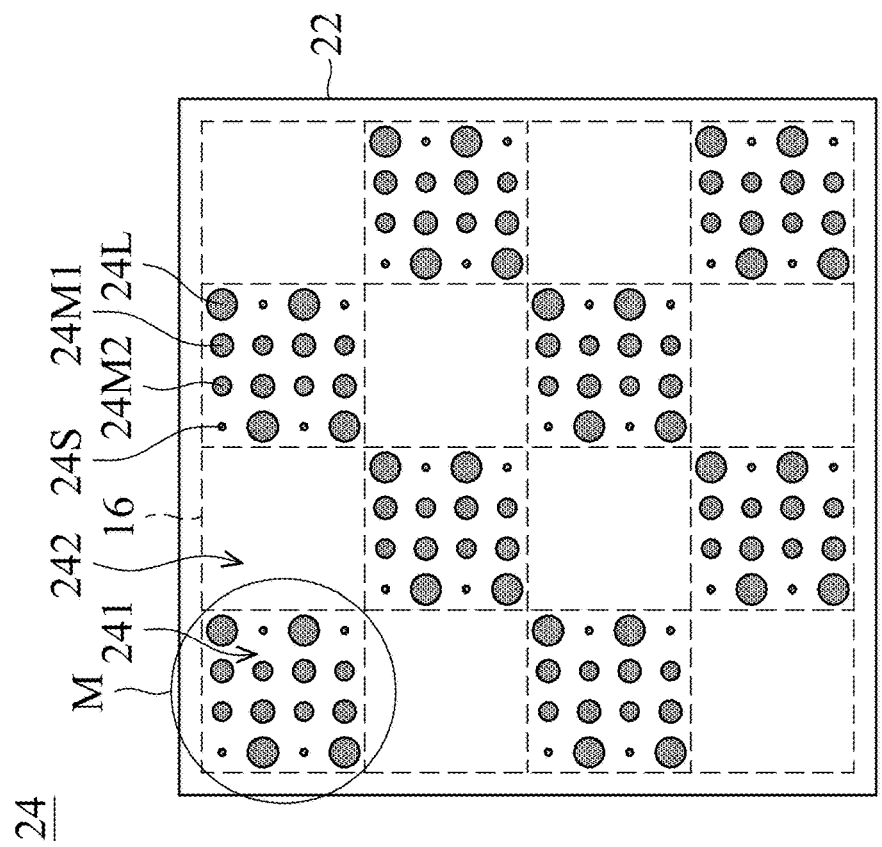

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean+/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1 is a cross-sectional view illustrating a portion of the solid-state image sensor 100 in accordance with some embodiments of the present disclosure. It should be noted that some components of the solid-state image sensor 100 have been omitted in FIG. 1 for the sake of brevity.

Referring to FIG. 1, in some embodiments, the solid-state image sensor 100 includes photoelectric conversion elements, such as has a photoelectric conversion element 11G that may be used for receiving green light, a photoelectric conversion element 11R that may be used for receiving red light, and a photoelectric conversion element 11I that may be used for receiving IR/NIR light as shown in FIG. 1, but the present disclosure is not limited thereto. The solid-state image sensor 100 may include other photoelectric conversion elements that are used for receiving, for example, blue light, yellow light, white light, cyan light, or magenta light, which may be adjusted depending on actual needs.

The photoelectric conversion elements may be disposed in a semiconductor substrate 10, and the semiconductor substrate 10 may be a wafer or a chip. For example, the semiconductor substrate 10 may include silicon, but the present disclosure is not limited thereto.

Moreover, the solid-state image sensor 100 may include an isolation structure (not shown) disposed between the photoelectric conversion elements. For example, the isolation structure may include a shallow trench isolation (STI) or a deep trench isolation (DTI). The isolation structure may be formed in the semiconductor substrate 10 by an etching process to form trenches and filling the trenches with an insulating or dielectric material, but the present disclosure is not limited thereto.

Referring to FIG. 1, in some embodiments, the solid-state image sensor 100 includes IR-cut filters 12 disposed above the photoelectric conversion elements 11G and the photoelectric conversion elements 11R. In other words, the IR-cut filters 12 may be disposed above the photoelectric conversion elements other than the photoelectric conversion elements 11I (that may be used for receiving IR/NIR light). The IR-cut filters 12 may include vacuum optical multilayer coatings to filter the IR/NIR light, which has high penetration of visible light, high reflection of infrared light, and may correct the color shift phenomenon of the solid-state image sensor 100 to reduce the interference of the IR/NIR light. The IR-cut filters 12 may also include dye/pigment polymer absorptive materials whose absorption band is determined by the chemical functional groups.

Referring to FIG. 1, in some embodiments, the solid-state image sensor 100 includes a grid structure 14 disposed between the IR-cut filters 12. The grid structure 14 may include a transparent dielectric material that has a low refractive index in a range from about 1.0 to about 1.99. The grid structure 14 may be formed by depositing a dielectric layer on the semiconductor substrate 10 and then patterning the dielectric layer using photolithography and etching processes, but the present disclosure is not limited thereto.

Referring to FIG. 1, in some embodiments, the solid-state image sensor 100 includes a color filter layer 16 disposed above the photoelectric conversion elements 11G, 11R, and 11I. In some embodiments, the color filter layer 16 includes (or is divided into) color filter segments (16G/16R) and transparent segments 16W. In more detail, the color filter layer 16 includes (or is divided into) green color filter segments 16G that correspond to the photoelectric conversion elements 11G, red color filter segments 16R that correspond to the photoelectric conversion elements 11R, and transparent segments 16W that correspond to the photoelectric conversion elements 11I, but the present disclosure is not limited thereto.

In some other embodiments, the color filter layer 16 has (or is divided into) other color filter segments. For example, the color filter layer 16 may have blue color filter segments 16B (shown in the following figures), a yellow color filter segment, a cyan color filter segment, or a magenta color filter segment, but the present disclosure is not limited thereto. In some embodiments, the grid structure 14 extends to be disposed between the color filter segments 16G/16R/16B and the transparent segments 16W.

Referring to FIG. 1, in some embodiments, the solid-state image sensor 100 includes a condensing structure 20 disposed above the color filter layer 16 for condensing incident light. The condensing structure 20 may include glass, epoxy resin, silicone resin, polyurethane, any other applicable material, or a combination thereof, but the present disclosure is not limited thereto. For example, the condensing structure 20 may be formed by a photoresist reflow method, a hot embossing method, any other applicable method, or a combination thereof. Moreover, the steps of forming the condensing structure 20 may include a spin coating process, a lithography process, an etching process, any other applicable process, or a combination thereof, but the present disclosure is not limited thereto.

As shown in FIG. 1, in some embodiments, the condensing structures 20 may be micro-lenses that correspond to the green color filter segments 16G, red color filter segments 16R, and the transparent segments 16W. In other words, micro-lenses may also correspond to the photoelectric conversion elements 11G, 11R, or 11I, but the present disclosure is not limited thereto. In some embodiments, the micro-lenses are formed into an m×n array, wherein m and n are positive integers.

In the embodiment shown in FIG. 1, each condensing structure 20 corresponds to one color filter segment 16G (or 16R) and/or one photoelectric conversion element 11G (or 11R), or one transparent segments 16W and/or one photoelectric conversion element 11I, but the present disclosure is not limited thereto. In some other embodiments, each condensing structure 20 corresponds to at least two (i.e., two or more) color filter segments and/or at least two (i.e., two or more) photoelectric conversion elements. That is, the number of condensing structures 20 is not limited to the embodiment shown in FIG. 1, which may be adjusted depending on actual needs.

The condensing structure 20 may include a semi-convex lens or a convex lens, but the present disclosure is not limited thereto. The condensing structure 20 may also include micro-pyramid structures (e.g., circular cone, quadrangular pyramid, and so on), or micro-trapezoidal structures (e.g., flat top cone, truncated square pyramid, and so on). Alternatively, the condensing structure 20 may be a gradient-index structure.

As shown in FIG. 1, in some embodiments, the solid-state image sensor 100 includes a planarization layer 18 disposed between the color filter layer 16 and the condensing structures 20. The planarization layer 18 may include the same or similar material as the condensing structure 20 and may be formed by the same or similar process as the condensing structure 20, but the present disclosure is not limited thereto.

Referring to FIG. 1, in some embodiments, the solid-state image sensor 100 includes a light-adjusting device 24 disposed above the condensing structures 20. For example, the light-adjusting device 24 may be a color router of the solid-state image sensor 100. As shown in FIG. 1, in some embodiments, the solid-state image sensor 100 includes a spacer layer 22 disposed between the condensing structures 20 and the light-adjusting device 24. In other words, the light-adjusting device 24 may be carried or mounted on the spacer layer 22, but the present disclosure is not limited thereto. The spacer layer 22 may include transparent dielectric material, but the present disclosure is not limited thereto.

As shown in FIG. 1, in some embodiments, the thickness T22 of the spacer layer 22 (or the shortest distance between the condensing structure 20 and the light-adjusting device 24) is greater than the thickness T24 of the light-adjusting device 24 and the thickness T20 of the condensing structure 20. For example, the thickness T22 of the spacer layer 22 may be greater than about 100 nm and less than about 2000 nm, and the thickness T24 of the light-adjusting device 24 may be less than or equal to about 500 nm (e.g., about 200 nm), but the present disclosure is not limited thereto.

FIG. 2 is a partial top view illustrating the color filter layer 16 according to some embodiments of the present disclosure. FIG. 3A is a partial top view illustrating the light-adjusting device 24 according to some embodiments of the present disclosure. It should be noted that the color filter layer 16 and the spacer layer 22 are also shown in FIG. 3A to show the relative positions between the color filter layer 16 (and the spacer layer 22) and the light-adjusting device 24.

Referring to FIG. 2, in some embodiments, two blue color filter segments 16B, four green color filter segments 16G, two red color filter segments 16R, and eight transparent segments 16W form a 4×4 array. As shown in FIG. 2, in this embodiments, the color filter segments (e.g., blue color filter segments 16B, green color filter segments 16G, and red color filter segments 16R) and the transparent segments 16W are staggered in X-direction and Y-direction that is perpendicular to X-direction.

In more detail, as shown in FIG. 2, two blue color filter segments 16B are arranged diagonally to each other, two green color filter segments 16G are arranged diagonally to each other, two red color filter segments 16R are arranged diagonally to each other, and each color filter segment (e.g., blue color filter segment 16B, green color filter segment 16G, or red color filter segment 16R) is adjacent to is one transparent segment 16W on either side of its four sides, but the present disclosure is not limited thereto.

The light-adjusting device 24 shown in FIG. 3A may be disposed on the spacer layer 22 shown in FIG. 1 and correspond to the color filter layer 16 shown in FIG. 1 and FIG. 2. As shown to FIG. 1 and FIG. 3A, in some embodiments, the light-adjusting device 24 has (or is divided into) first regions 241 and second regions 242, and the light-adjusting device 24 includes pillars 24L that form several groups of meta structures M. In this embodiment, the first regions 241 and the second regions 242 are staggered in X-direction and Y-direction.

Moreover, the groups of meta structures M correspond to the first regions 241, and from a top view (e.g., FIG. 3A), the first regions 241 and the second regions 242 are arranged in a checkerboard pattern. For example, each group of meta structures M includes three pillars 24L that are arranged along Y-direction, but the present disclosure is not limited thereto.

As shown to FIG. 1, FIG. 2, and FIG. 3A, in some embodiments, the first regions 241 of the light-adjusting device 24 are disposed on the color filter segments (e.g., blue color filter segments 16B, green color filter segments 16G, or red color filter segments 16R). In other words, the groups of meta structures M (i.e., pillars 24L) correspond to the color filter segments. In this embodiment, each group of meta structures M (i.e., the pillars 24L) may perform a bidirectional splitting function, so that the light to be incident into the color filter segment (e.g., blue color filter segment 16B, green color filter segment 16G, or red color filter segment 16R) may be partially distributed to the transparent segments on both sides in the positive and negative X-directions.

FIG. 3B, FIG. 3C, FIG. 3D, FIG. 3E, FIG. 3F, and FIG. 3G are partial top views illustrating the light-adjusting device 24 according to some other embodiments of the present disclosure. Similarly, the light-adjusting device 24 shown in FIG. 3B, FIG. 3C, FIG. 3D, FIG. 3E, FIG. 3F, or FIG. 3G may be disposed on the spacer layer 22 shown in FIG. 1 and correspond to the color filter layer 16 shown in FIG. 1 and FIG. 2.

Figure 3A:
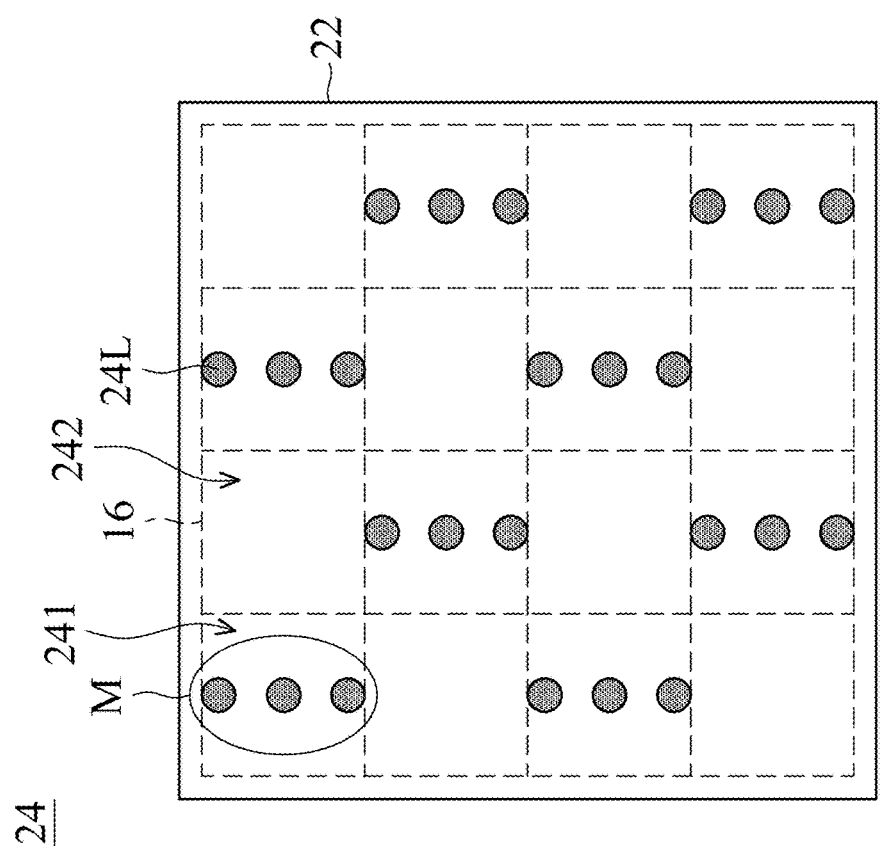
FIG. 3A is a partial top view illustrating the light-adjusting device according to some embodiments of the present disclosure.

As shown in FIG. 3B, the pillars include (or are divided into) pillars 24L, pillars 24M1, pillars 24M2, and pillars 24S. From a top view (i.e., FIG. 3B), the sectional area of the pillar 24L is larger than the sectional area of the pillar 24M1, the sectional area of the pillar 24M1 is larger than the sectional area of the pillar 24M2, and the sectional area of the pillar 24M2 is larger than the sectional area of the pillar 24S. In more detail, in each group of meta structures M, the pillar 24L, the pillar 24M1, the pillar 24M2, and the pillar 24S are sequentially arranged in a row in the positive and negative X-directions.

As shown in FIG. 3C, the pillars include (or are divided into) pillars 24L and pillars 24S, and from a top view (i.e., FIG. 3C), the sectional area of the pillar 24L is larger than the sectional area of the pillar 24S. In more detail, in each group of meta structures M, the pillars 24L and the pillars 24S are staggered in a row in the positive and negative X-directions.

Similarly, in the embodiments shown in FIG. 3B and FIG. 3C, each group of meta structures M (i.e., pillars 24L, pillars 24M1, pillars 24M2, and/or pillars 24S) may perform a bidirectional splitting function, so that the light to be incident into the color filter segment (e.g., blue color filter segment 16B, green color filter segment 16G, or red color filter segment 16R) may be partially distributed to the transparent segments on both sides in the positive and negative X-directions.

As shown in FIG. 3D, the pillars include (or are divided into) pillars 24L and pillars 24S, and from a top view (i.e., FIG. 3D), the sectional area of the pillar 24L is larger than the sectional area of the pillar 24S. In more detail, in each group of meta structures M, the pillars 24L and the pillars 24S are staggered in a row in the positive and negative Y-directions.

In the embodiment shown in FIG. 3D, each group of meta structures M (i.e., pillars 24L and pillars 24S) may perform a bidirectional splitting function, so that the light to be incident into the color filter segment (e.g., blue color filter segment 16B, green color filter segment 16G, or red color filter segment 16R) may be partially distributed to the transparent segments on both sides in the positive and negative Y-directions.

Figure 3G:
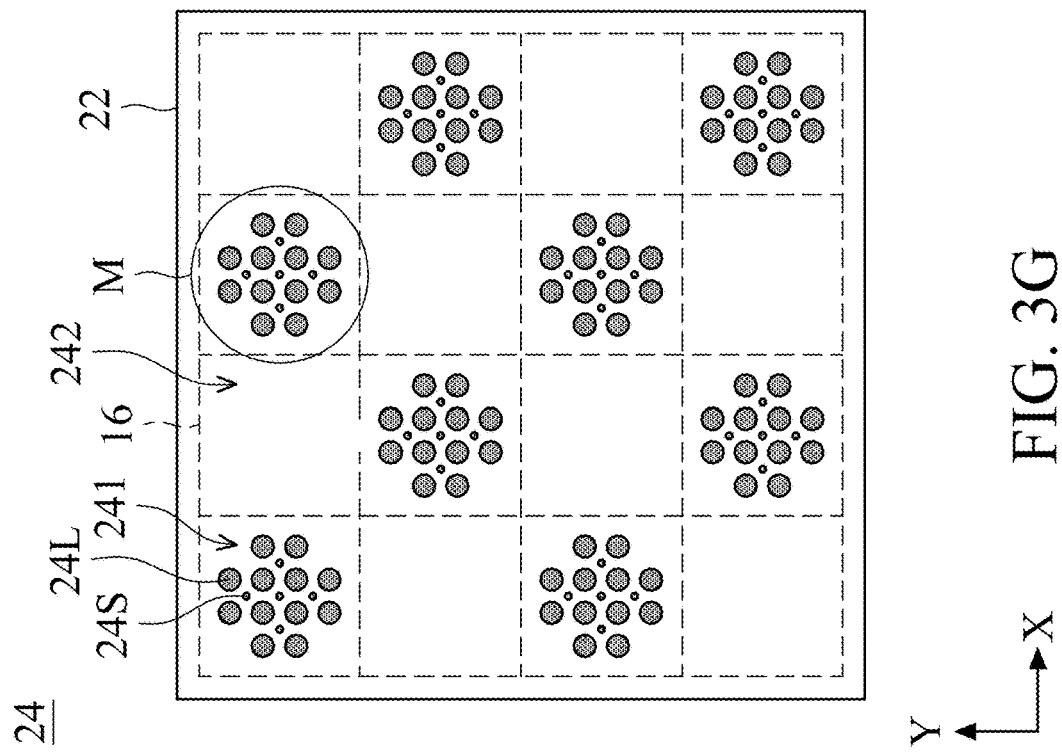

As shown in FIG. 3E, FIG. 3F, and FIG. 3G, the pillars include (or are divided into) pillars 24L and pillars 24S, and from a top view (i.e., FIG. 3E, FIG. 3F, or FIG. 3G), the sectional area of the pillar 24L is larger than the sectional area of the pillar 24S. In more detail, in each group of meta structures M, the pillars 24L are arranged to form a cross, and the pillars 24S are arranged to form a cross.

In the embodiment shown in FIG. 3E, some pillars (e.g., pillars 24L) correspond to the second regions 242 of the light-adjusting device 24. In other word, some pillars (e.g., pillars 24L) correspond to the transparent segments 16W as shown in FIG. 2 and FIG. 3E.

In the embodiment shown in FIG. 3F, some pillars (e.g., pillars 24S) correspond to the interface between the first regions 241 and the second regions 242 of the light-adjusting device 24. In other word, some pillars (e.g., pillars 24S) correspond to the interface between the color filter segment (e.g., blue color filter segment 16B, green color filter segment 16G, or red color filter segment 16R) and the transparent segments 16W as shown in FIG. 2 and FIG. 3F.

In the embodiments shown in FIG. 3E, FIG. 3F, and FIG. 3G, each group of meta structures M (i.e., pillars 24L and pillars 24S) may perform a cross splitting function, so that the light to be incident into the color filter segment (e.g., blue color filter segment 16B, green color filter segment 16G, or red color filter segment 16R) may be partially distributed to the transparent segments on both sides in the positive and negative X-directions and on both sides in the positive and negative Y-directions.

Figure 4A:
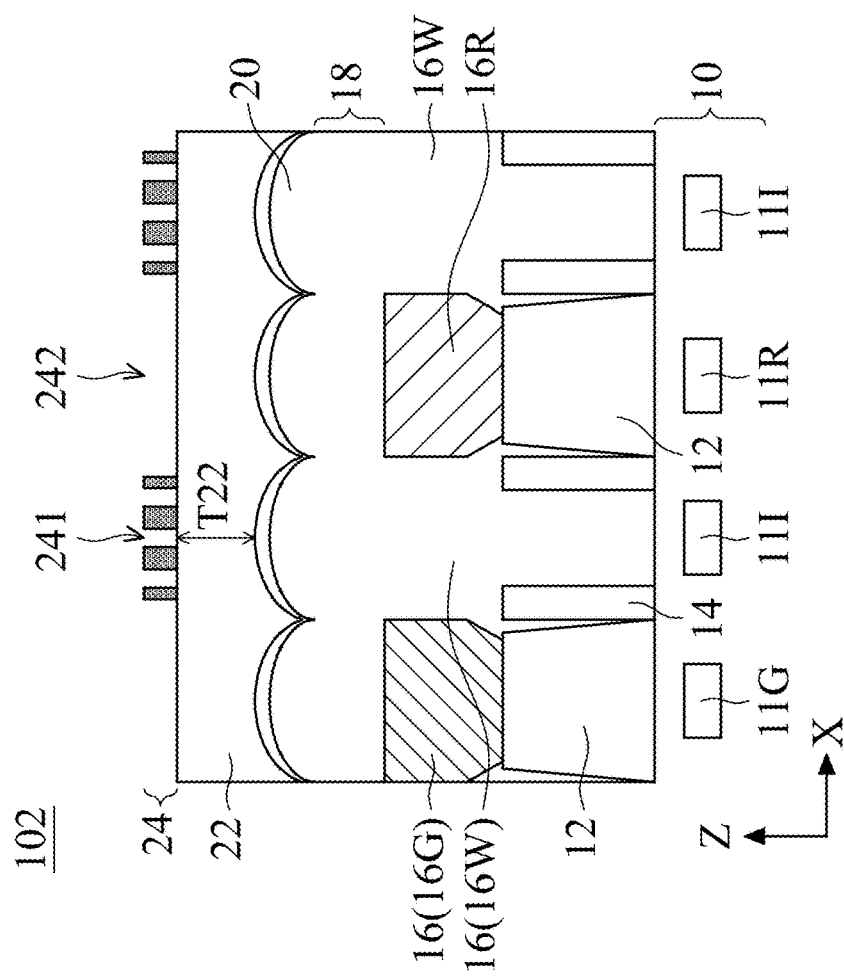
FIG. 4A is a cross-sectional view illustrating a portion of the solid-state image sensor in accordance with some other embodiments of the present disclosure.

FIG. 4A is a cross-sectional view illustrating a portion of the solid-state image sensor 102 in accordance with some other embodiments of the present disclosure. Similarly, some components of the solid-state image sensor 102 have been omitted in FIG. 4A for the sake of brevity.

The solid-state image sensor 102 shown in FIG. 4A has a similar structure to the solid-state image sensor 100 shown in FIG. 1. The main difference from the solid-state image sensor 100 shown in FIG. 1 is that the first regions 241 of the light-adjusting device 24 in the solid-state image sensor 102 shown in FIG. 4A are disposed on the transparent segments 16W. Moreover, the partial top view illustrating the color filter layer 16 in the solid-state image sensor 102 shown in FIG. 4A may be the same or similar to the color filter layer 16 shown in FIG. 2.

Figure 4B:
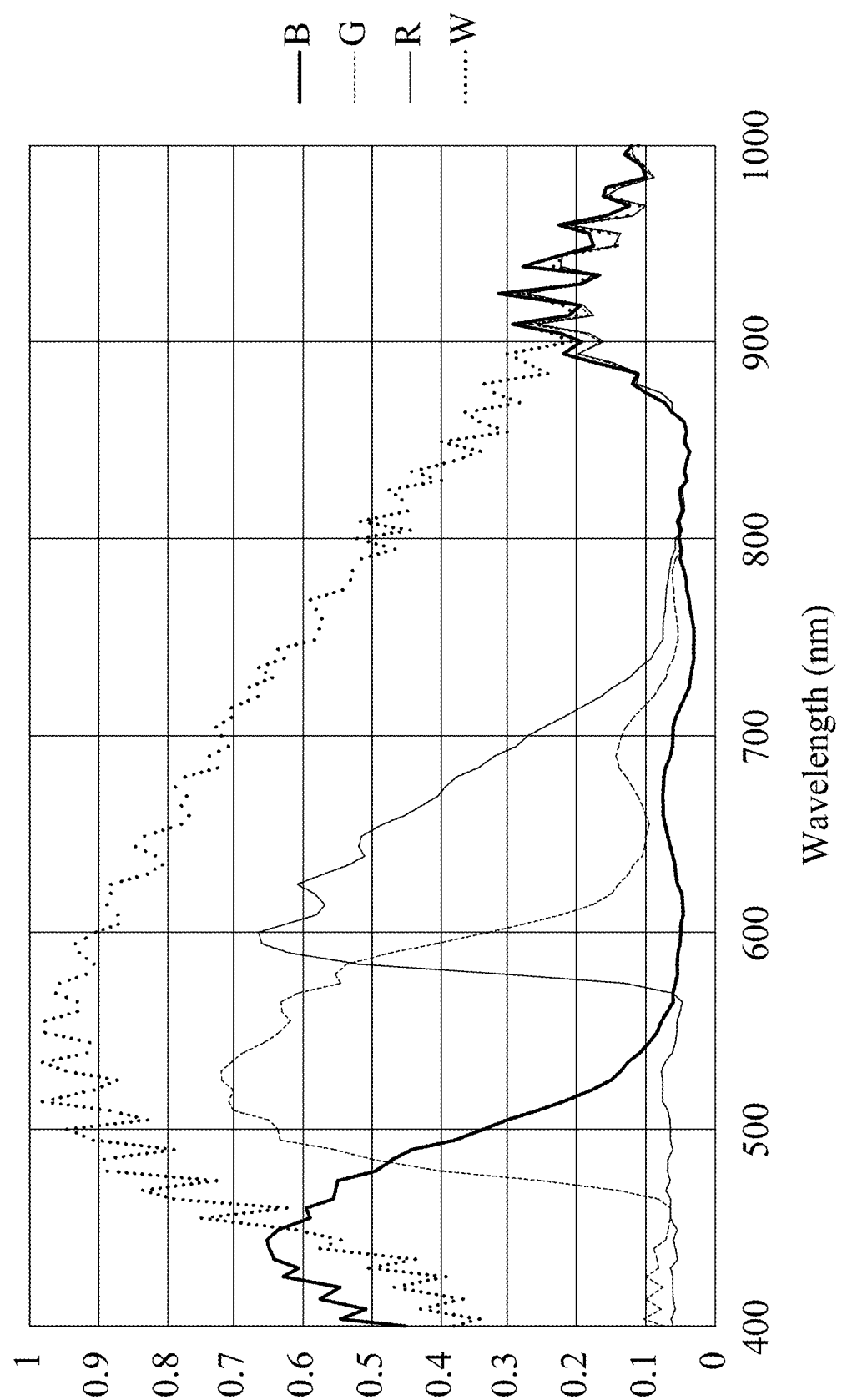
FIG. 4B is a quantum efficiency spectrum of the solid-state image sensor shown in FIG. 4A.
Figure 4C:
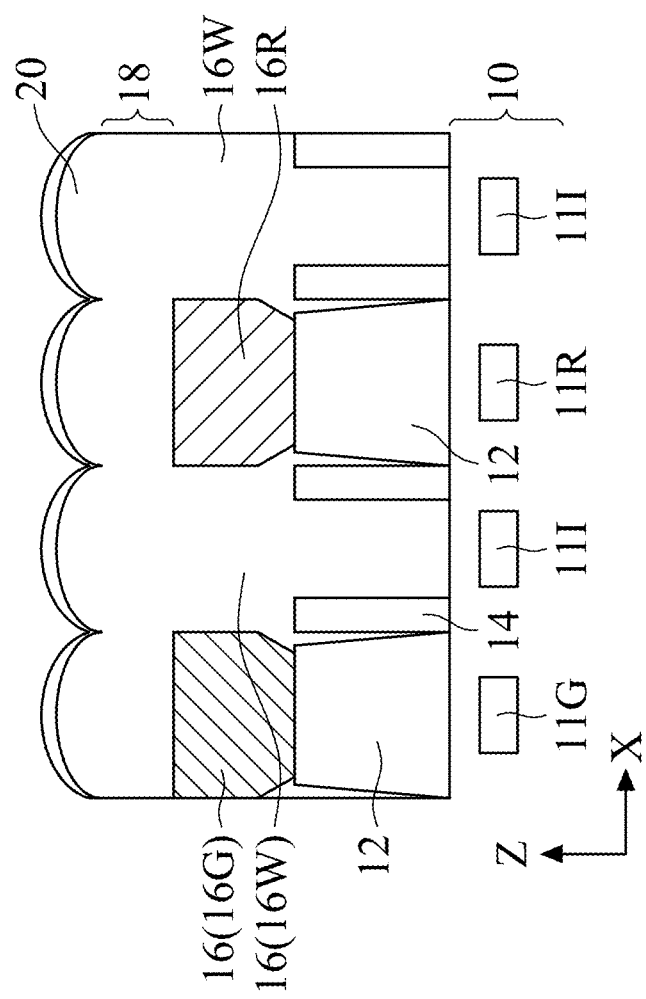
FIG. 4C is a cross-sectional view illustrating a portion of the solid-state image sensor in accordance with a reference example.
Figure 4D:
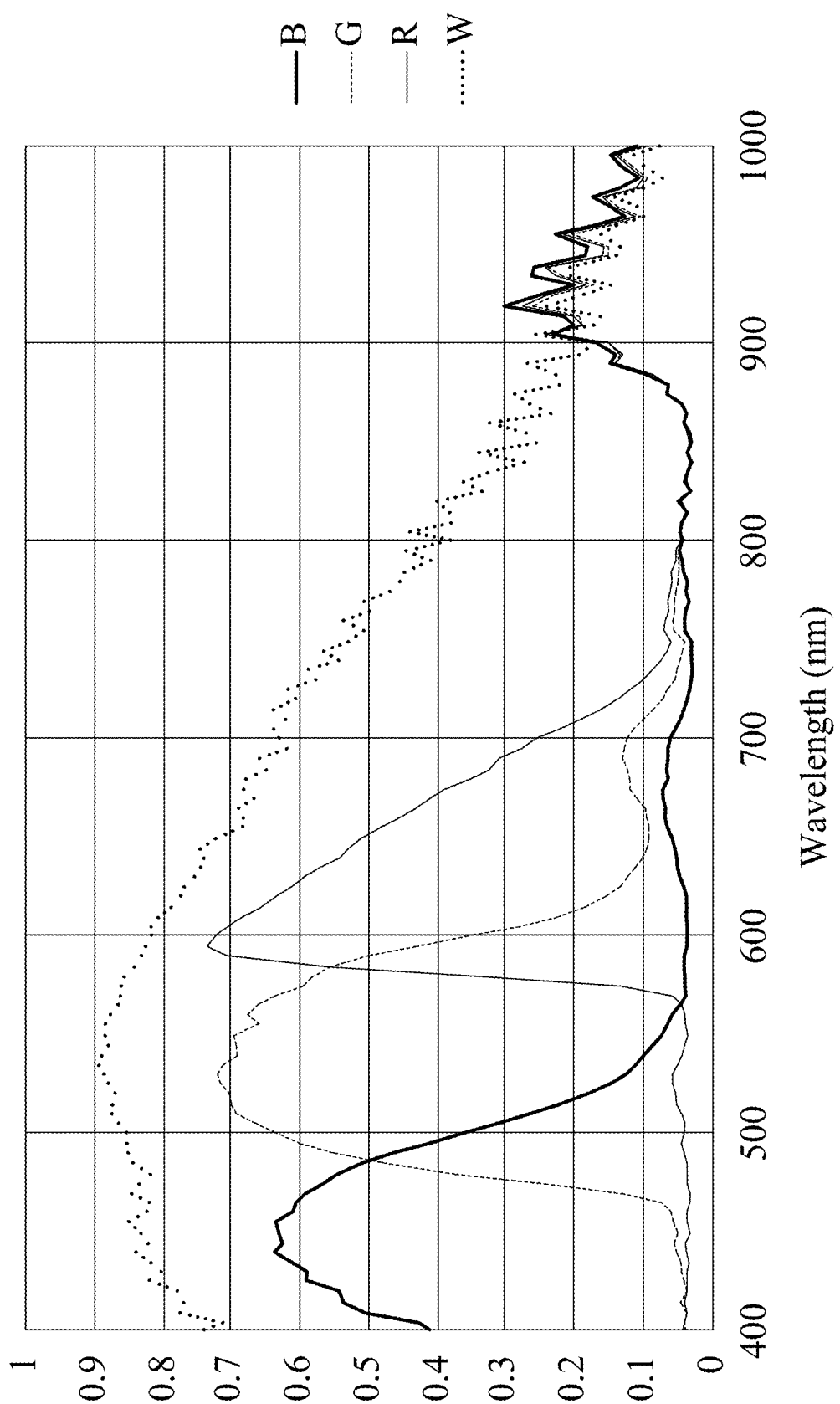
FIG. 4D is a quantum efficiency spectrum of the solid-state image sensor shown in FIG. 4C.

FIG. 4B is a quantum efficiency spectrum of the solid-state image sensor 102 shown in FIG. 4A. FIG. 4C is a cross-sectional view illustrating a portion of the solid-state image sensor 103 in accordance with a reference example. FIG. 4D is a quantum efficiency spectrum of the solid-state image sensor 103 shown in FIG. 4C. The main difference from the solid-state image sensor 102 shown in FIG. 4A is that the solid-state image sensor 103 shown in FIG. 4C does not include the spacer layer 22 and the light-adjusting device 24.

The quantum efficiency of the solid-state image sensor 102 in IR/NIR region (e.g., near 800 nm) is about 0.5 as shown in FIG. 4B, while the quantum efficiency of the solid-state image sensor 103 in IR/NIR region (e.g., near 800 nm) is about 0.4 as shown in FIG. 4D. That is, the quantum efficiency of the solid-state image sensor 102 in IR/NIR region (e.g., near 800 nm) according to the embodiment of the present disclosure is effectively improved compared with the solid-state image sensor 103 of the reference example. Moreover, the quantum efficiency of the solid-state image sensor 102 may be adjusted by changing the thickness T22 of the spacer layer 22.

SNR10 value is the brightness index required to obtain a signal-to-noise (SNR) ratio equal to 10 after the white pixels of the solid-state image sensor are illuminated by collimated light, and the unit of the SNR10 value is illuminance (lux). The SNR10 value of solid-state image sensor 102 according to the embodiment of the present disclosure is about 7.877, while the SNR10 value of the solid-state image sensor 103 of the reference example is about 9.085. That is, the solid-state image sensor 102 according to the embodiment of the present disclosure may obtain better image quality under lower illumination.

FIG. 5A, FIG. 5B, FIG. 5C, FIG. 5D, FIG. 5E, and FIG. 5F are partial top views illustrating the light-adjusting device 24 according to some other embodiments of the present disclosure. The light-adjusting device 24 shown in FIG. 5A, FIG. 5B, FIG. 5C, FIG. 5D, FIG. 5E, and FIG. 5F may be disposed on the spacer layer 22 shown in FIG. 4A and correspond to the color filter layer 16 shown in FIG. 2 and FIG. 4A.

Figure 5B:
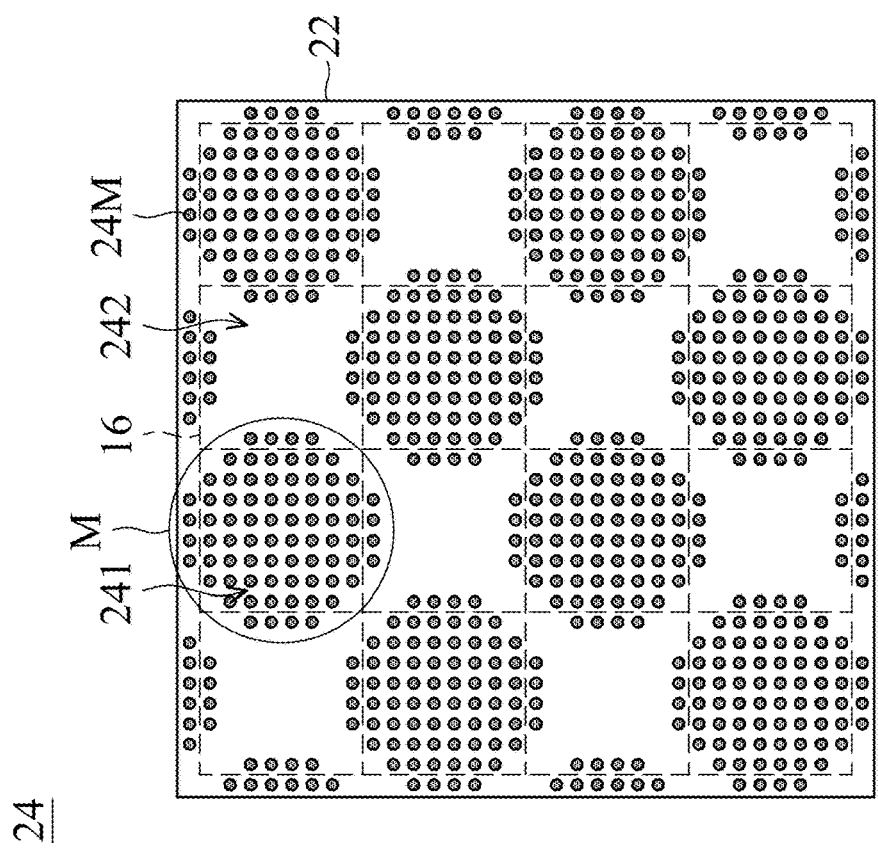
FIG. 5A, FIG. 5B, FIG. 5C, FIG. 5D, FIG. 5E, and FIG. 5F are partial top views illustrating the light-adjusting device according to some other embodiments of the present disclosure.
Figure 5A:
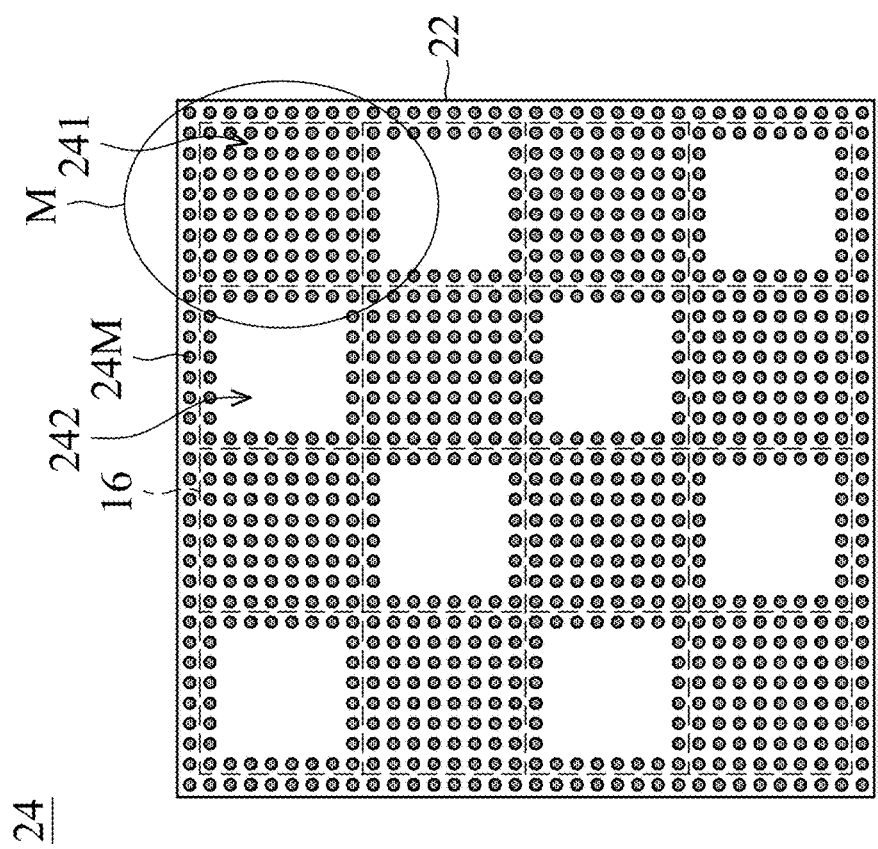
Figure 5D:
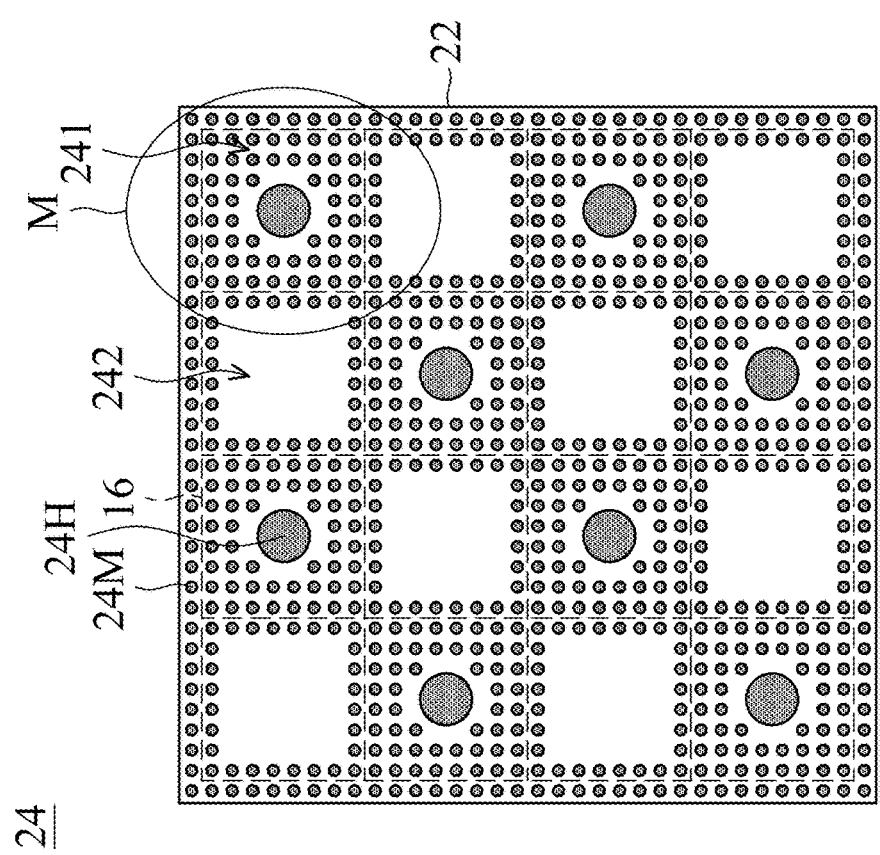
Figure 5C:
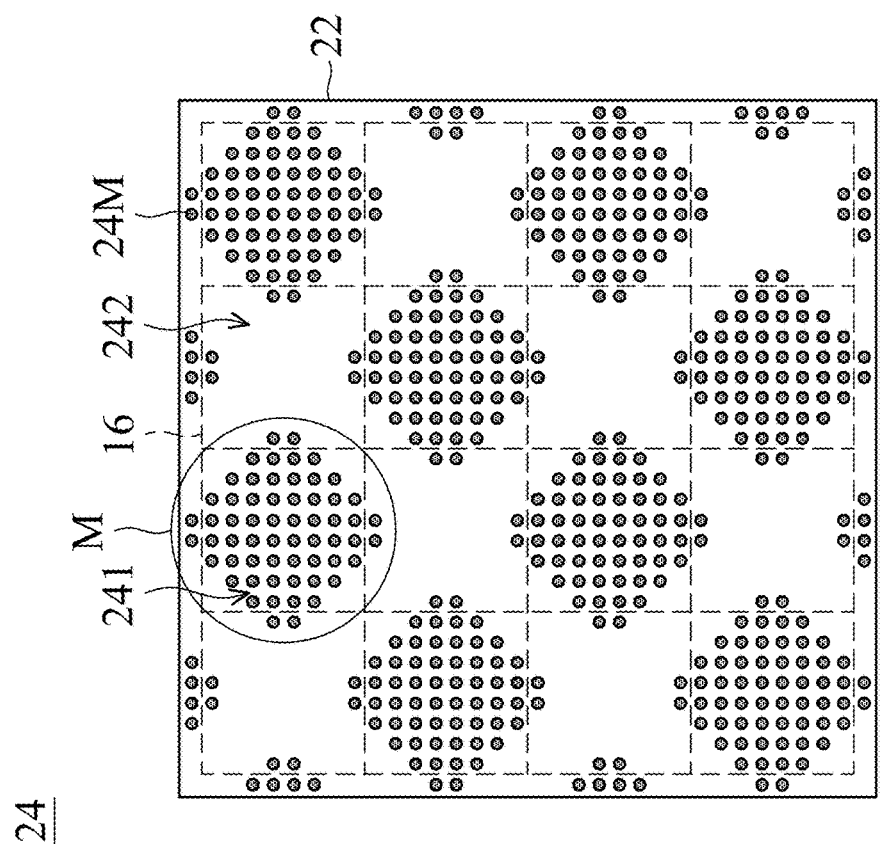

In the embodiment shown in FIG. 5A, FIG. 5B, and FIG. 5C, some pillars 24M correspond to the second regions 242 of the light-adjusting device 24. In other word, some pillars 24M correspond to the color filter segment (e.g., blue color filter segment 16B, green color filter segment 16G, or red color filter segment 16R) as shown in FIG. 2 and FIG. 5A, FIG. 5B, and FIG. 5C.

As shown in FIG. 5A, the pillars 24M in each group of meta structures M are arranged to form a rectangle (or an array). As shown in FIG. 5B, the pillars 24M in each group of meta structures M are arranged to form an octagon. As shown in FIG. 5C, the pillars 24M in each group of meta structures M are arranged to form another octagon that is different from the group of meta structures M shown in FIG. 5B.

Figure 5E:
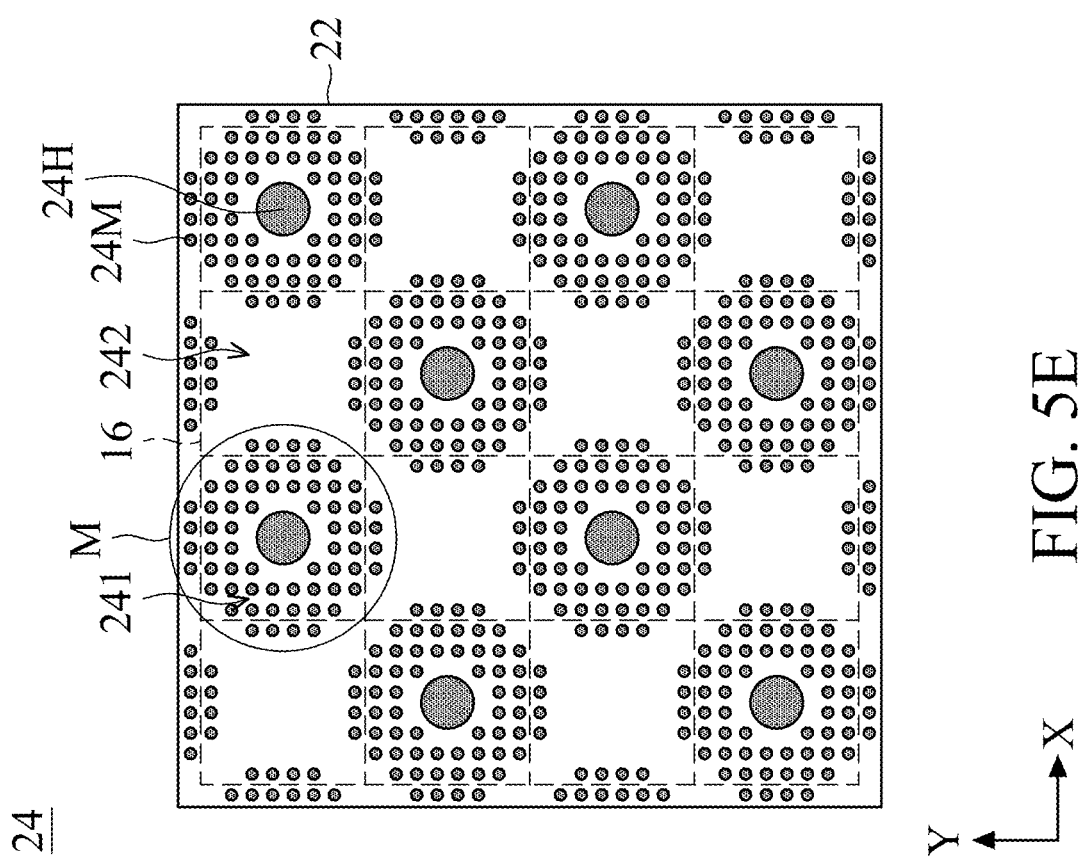
Figure 5G:
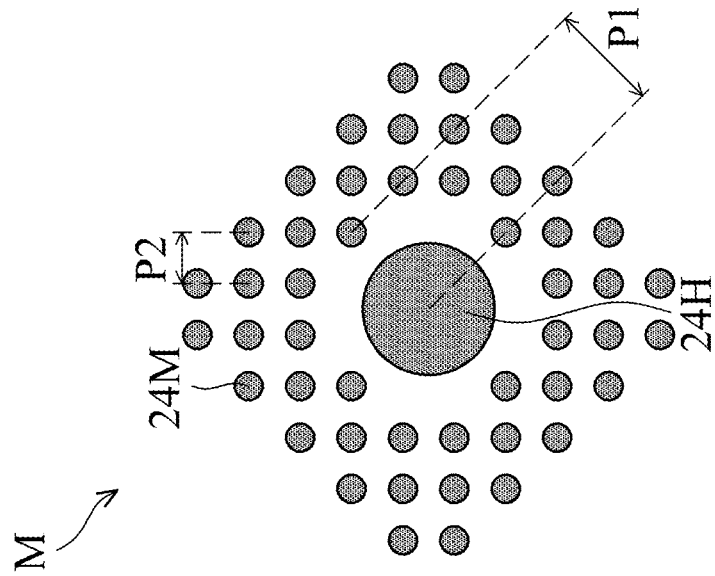
FIG. 5G is a partial top view illustrating one group of meta structures in FIG. 5F.
Figure 5F:
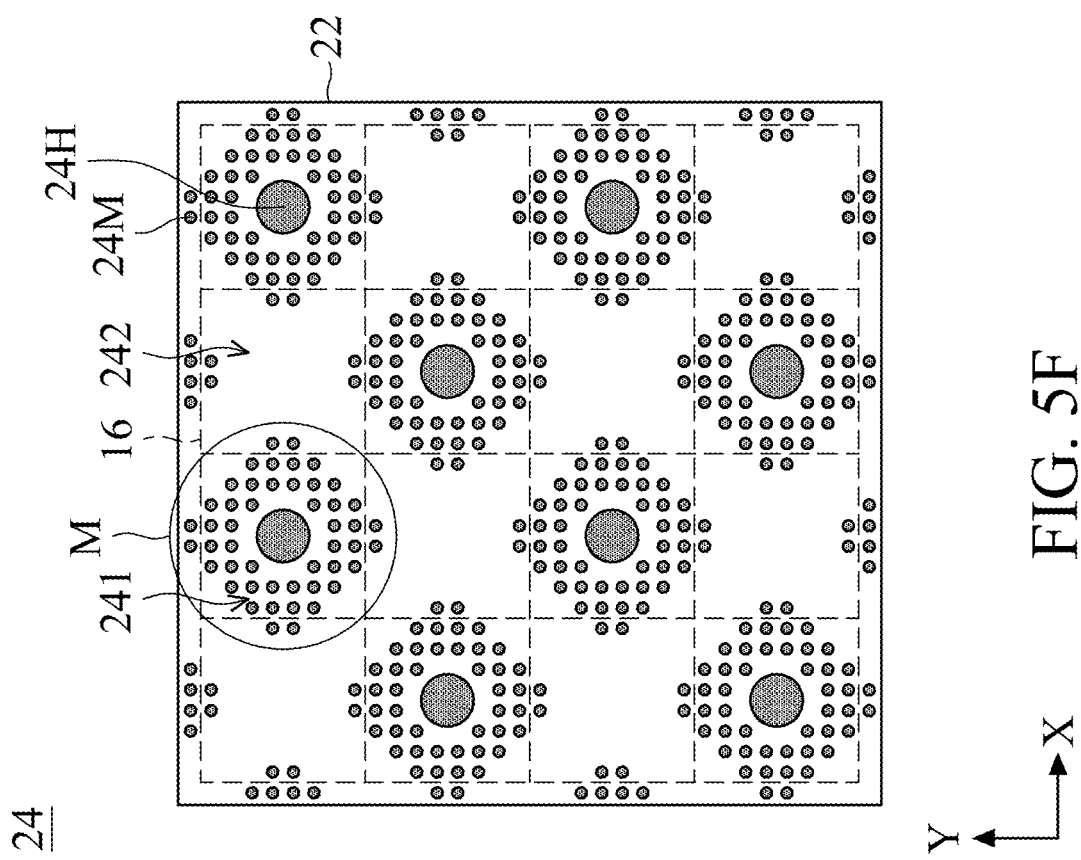

The arrangement of the pillars 24M in each group of meta structures M in FIG. 5D, FIG. 5E, and FIG. 5F are similar to the arrangement of the pillars 24M in the respective group of meta structures M in FIG. 5A, FIG. 5B, and FIG. 5C. The main difference from the arrangement of the pillars 24M in each group of meta structures M in FIG. 5A, FIG. 5B, and FIG. 5C is that a central pillar 24H is disposed in each group of meta structures M in FIG. 5D, FIG. 5E, and FIG. 5F, and from a top view, the sectional area of the central pillar 24H is larger than the sectional area of the other pillars 24M.

Moreover, in some embodiments, the central pillar 24H corresponds to the center of the (corresponding) transparent segment 16W, but the present disclosure is not limited thereto. In some other embodiments, the central pillar 24H corresponds to the center of the (corresponding) color filter segment (e.g., blue color filter segment 16B, green color filter segment 16G, or red color filter segment 16R).

FIG. 5G is a partial top view illustrating one group of meta structures M in FIG. 5F. As shown in FIG. 5G, in some embodiments, the pillar 24H and the closest pillar 24M define a first period P1, two adjacent pillars 24M define a second period P2, and the first period P1 is greater than the second period P2.

FIG. 6A is a partial top view illustrating the light-adjusting device 24 according to some embodiments of the present disclosure. The light-adjusting device 24 shown in FIG. 6A may be disposed on the spacer layer 22 shown in FIG. 4A and correspond to the color filter layer 16 shown in FIG. 2 and FIG. 4A. Moreover, FIG. 6A further shows the corresponding blue color filter segments 16B1, 16B2, green color filter segments 16G1, 16G2, 16G3, 16G4, red color filter segments 16R1, 16R2, and transparent segments 16W1, 16W2, 16W3, 16W4, 16W5, 16W6, 16W7, 16W8.

In some embodiments, the groups of meta structures have different pillar arrangements. As shown in FIG. 6A, the pillars 24M form groups of meta structures M1, groups of meta structures M2, group of meta structures M3, and groups of meta structures M4 that have different sizes of taper-adjacent-rectangular arrangement.

FIG. 6B, FIG. 6C, FIG. 6D, and FIG. 6E are enlarged views of the group of meta structures M1, the group of meta structures M2, the group of meta structures M3, and the group of meta structures M4 shown in FIG. 6A, respectively. As shown in FIG. 6A and FIG. 6B, the groups of meta structures M1 correspond to the transparent segments 16W1, 16W3. As shown in FIG. 6A and FIG. 6C, the groups of meta structures M2 correspond to the transparent segments 16W2, 16W4, 16W7 (some pillars that correspond to the transparent segments 16W2 and 16W7 are not shown in FIG. 6A). As shown in FIG. 6A and FIG. 6D, the group of meta structures M3 corresponds to the transparent segment 16W5. As shown in FIG. 6A and FIG. 6E, the groups of meta structures M4 correspond to the transparent segments 16W6, 16W8.

As shown in FIG. 6A to FIG. 6E, in some embodiments, each group of meta structures corresponds to a specific transparent segment (or specific transparent segments) and has a specific pillar arrangement, and the specific pillar arrangement is variable depending on the color filter segments that surround the specific transparent segment.

In this embodiment, one of the second regions 242 that corresponds to the blue color filter segment (e.g., 16B2) is surrounded by two groups of meta structures M1, one group of meta structures M2, and one group of meta structures M3. That is, the second region 242 that corresponds to the blue color filter segment is surrounded by pillar arrangements that have different sizes of taper-adjacent-rectangular arrangement.

In this embodiment, some pillars 24M (circled in FIG. 6C, FIG. 6D, and FIG. 6E) correspond to the red color filter segments 16R1, 16R2. Furthermore, in this embodiment, the number of pillars 24M in the groups of meta structures M1, M2, M3, and M4 are different.

FIG. 7A is a partial top view illustrating the light-adjusting device 24 according to some embodiments of the present disclosure. FIG. 7B, FIG. 7C, FIG. 7D, and FIG. 7E are enlarged views of the group of meta structures M1, the group of meta structures M2, the group of meta structures M3, and the group of meta structures M4 shown in FIG. 7A, respectively.

In this embodiments, a central pillar 24H is disposed in the group of meta structures M1, the group of meta structures M2, the group of meta structures M3, and the group of meta structures M4, and from a top view, the sectional area of the central pillar 24H is larger than the sectional area of the other pillars 24M.

Moreover, in this embodiments, the central pillars 24H correspond to the centers of the transparent segments 16W1, 16W2, 16W3, 16W4, 16W5, 16W6, 16W7, 16W8. Compared with the embodiment shown in FIG. 6A, the number of pillars 24M shown in FIG. 7A is reduced on the side that corresponds to the position adjacent to the green color filter segment 16G1, 16G2, 16G3, or 16G4, but the present disclosure is not limited thereto.

Figure 9A:
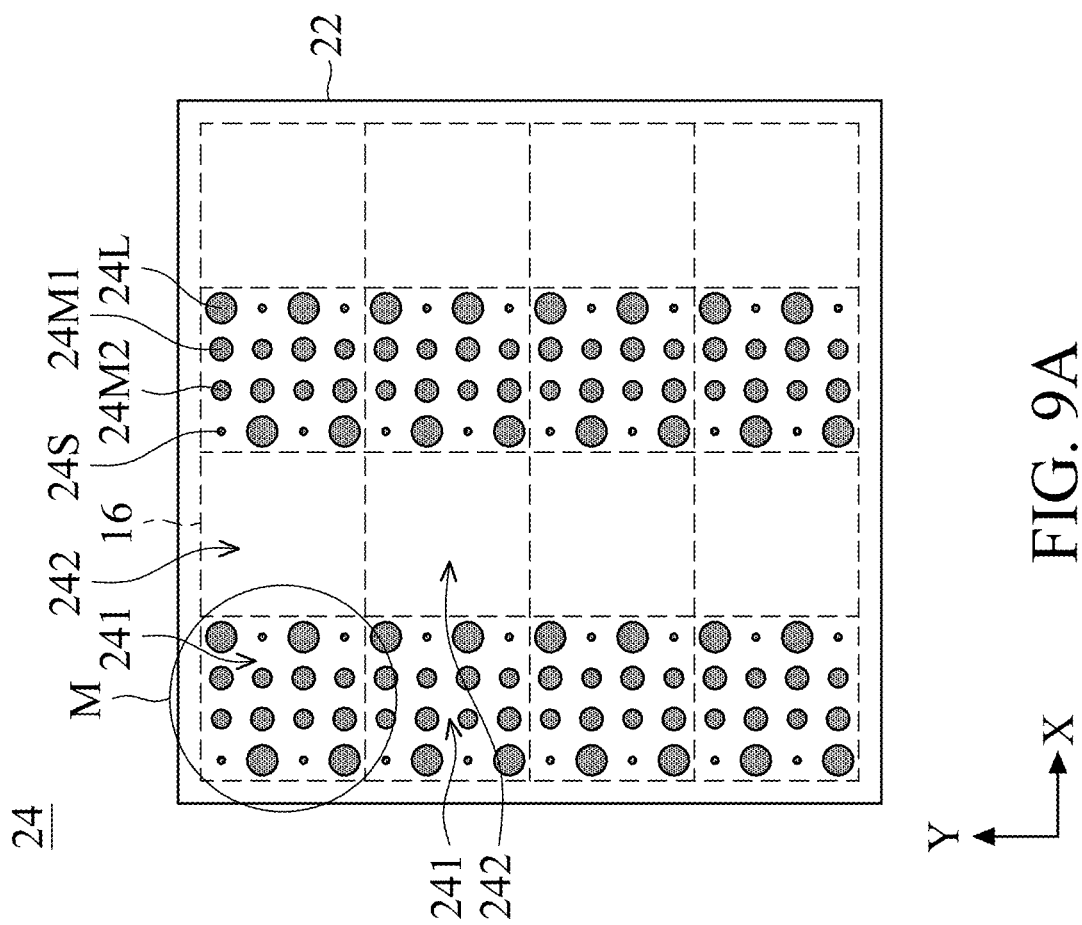
Figure 8:
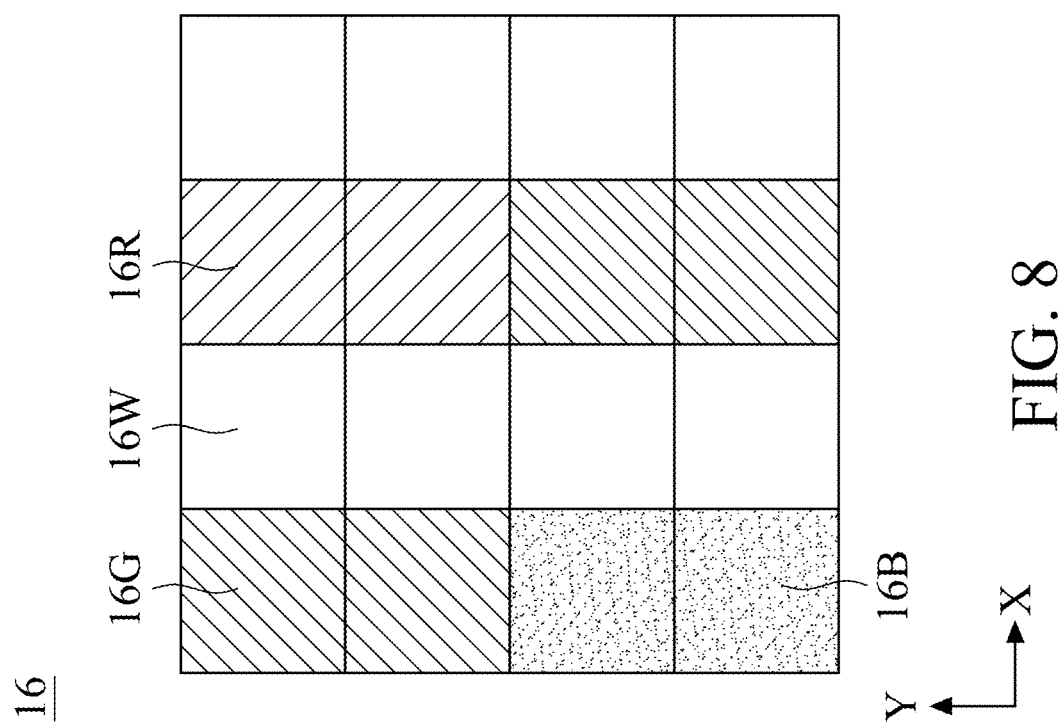
FIG. 8 is a partial top view illustrating the color filter layer according to some other embodiments of the present disclosure.

FIG. 8 is a partial top view illustrating the color filter layer 16 according to some other embodiments of the present disclosure. The color filter layer 16 shown in FIG. 8 may replace the color filter layer 16 of FIG. 2 and be disposed in the solid-state image sensor 100 shown in FIG. 1 or the solid-state image sensor 102 shown in FIG. 4A. FIG. 9A, FIG. 9B, and FIG. 9C are partial top views illustrating the light-adjusting device 24 according to some other embodiments of the present disclosure. Similarly, the light-adjusting device 24 shown in FIG. 9A, FIG. 9B, and FIG. 9C may be disposed on the spacer layer 22 shown in FIG. 1 and correspond to the color filter layer 16 shown in FIG. 1 and FIG. 8.

Referring to FIG. 8, in some embodiments, two blue color filter segments 16B, four green color filter segments 16G, two red color filter segments 16R, and eight transparent segments 16W form a 4×4 array. As shown in FIG. 8, in this embodiments, the color filter segments (e.g., blue color filter segments 16B, green color filter segments 16G, and red color filter segments 16R) and the transparent segments 16W are staggered in X-direction. Moreover, as shown in FIG. 8, in this embodiment, the color filter segments are adjacent to each other along Y-direction (that is perpendicular to X-direction), and the transparent segments 16W are adjacent to each other along Y-direction. Furthermore, as shown in FIG. 8, in this embodiment, two color filter segments for receiving the same color are adjacent to each other along Y-direction.

As shown in FIG. 9A, FIG. 9B, and FIG. 9C, in these embodiments, the first regions 241 and the second regions 242 of the light-adjusting device 24 are staggered in X-direction. Moreover, in these embodiments, the first regions 241 are adjacent to each other along Y-direction (that is perpendicular to X-direction), and the second regions 242 are adjacent to each other along Y-direction.

As shown in FIG. 9A, in this embodiment, the arrangement of the pillars in each group of meta structures M is similar to the arrangement of the pillars in each group of meta structures M in FIG. 3B. That is, in each group of meta structures M, the pillar 24L, the pillar 24M1, the pillar 24M2, and the pillar 24S are sequentially arranged in a row in the positive and negative X-directions.

As shown in FIG. 9B, in this embodiment, the arrangement of the pillars in each group of meta structures M is similar to the arrangement of the pillars in each group of meta structures M in FIG. 3C. That is, in each group of meta structures M, the pillars 24L and the pillars 24S are staggered in a row in the positive and negative X-directions.

As shown in FIG. 9C, in this embodiment, the groups of meta structures have different pillar arrangements. Moreover, in this embodiment, the number of pillars (24L and 24S) is different in each group of meta structures, and some pillars correspond to the second regions 242 of the light-adjusting device 24.

Figure 10:
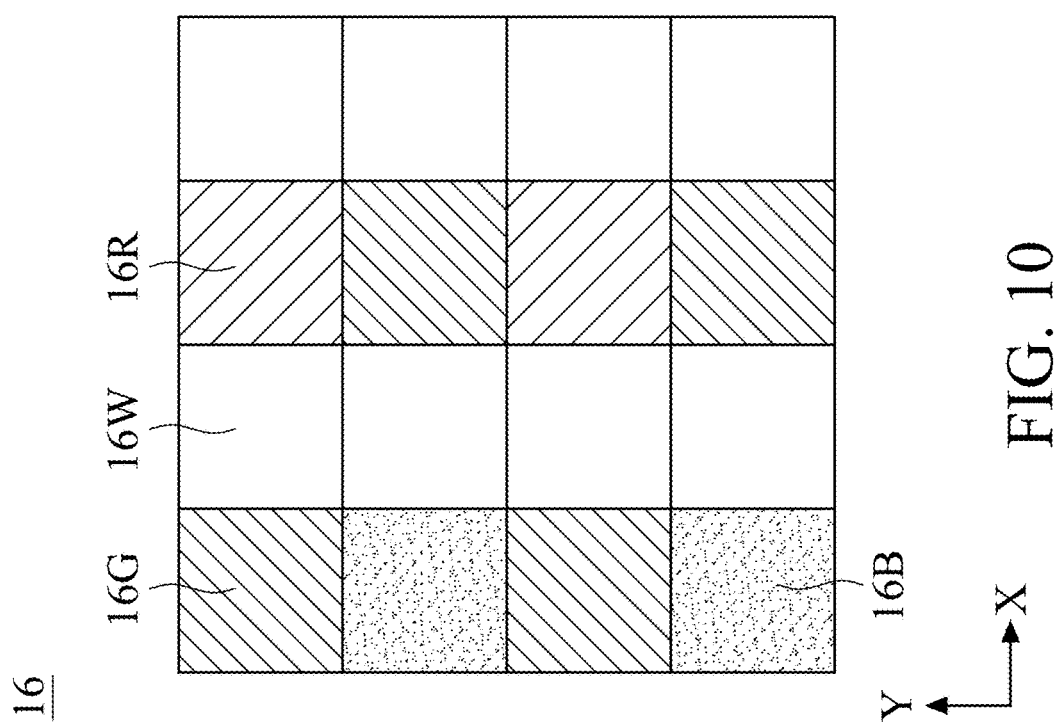
FIG. 10 is a partial top view illustrating the color filter layer according to some other embodiments of the present disclosure.

FIG. 10 is a partial top view illustrating the color filter layer 16 according to some other embodiments of the present disclosure. Similarly, the color filter layer 16 shown in FIG. 10 may replace the color filter layer 16 of FIG. 2 and be disposed in the solid-state image sensor 100 shown in FIG. 1 or the solid-state image sensor 102 shown in FIG. 4A. Moreover, the light-adjusting device 24 shown in FIG. 9A, FIG. 9B, and FIG. 9C may be disposed on the spacer layer 22 shown in FIG. 1 and correspond to the color filter layer 16 shown in FIG. 1 and FIG. 10.

Referring to FIG. 10, in some embodiments, two blue color filter segments 16B, four green color filter segments 16G, two red color filter segments 16R, and eight transparent segments 16W form a 4×4 array. As shown in FIG. 10, in this embodiments, the color filter segments (e.g., blue color filter segments 16B, green color filter segments 16G, and red color filter segments 16R) and the transparent segments 16W are staggered in X-direction. Moreover, as shown in FIG. 10, in this embodiment, the color filter segments are adjacent to each other along Y-direction (that is perpendicular to X-direction), and the transparent segments 16W are adjacent to each other along Y-direction. Furthermore, as shown in FIG. 10, in this embodiment, two color filter segments for receiving the same color are separated from each other along Y-direction.

Figure 11:
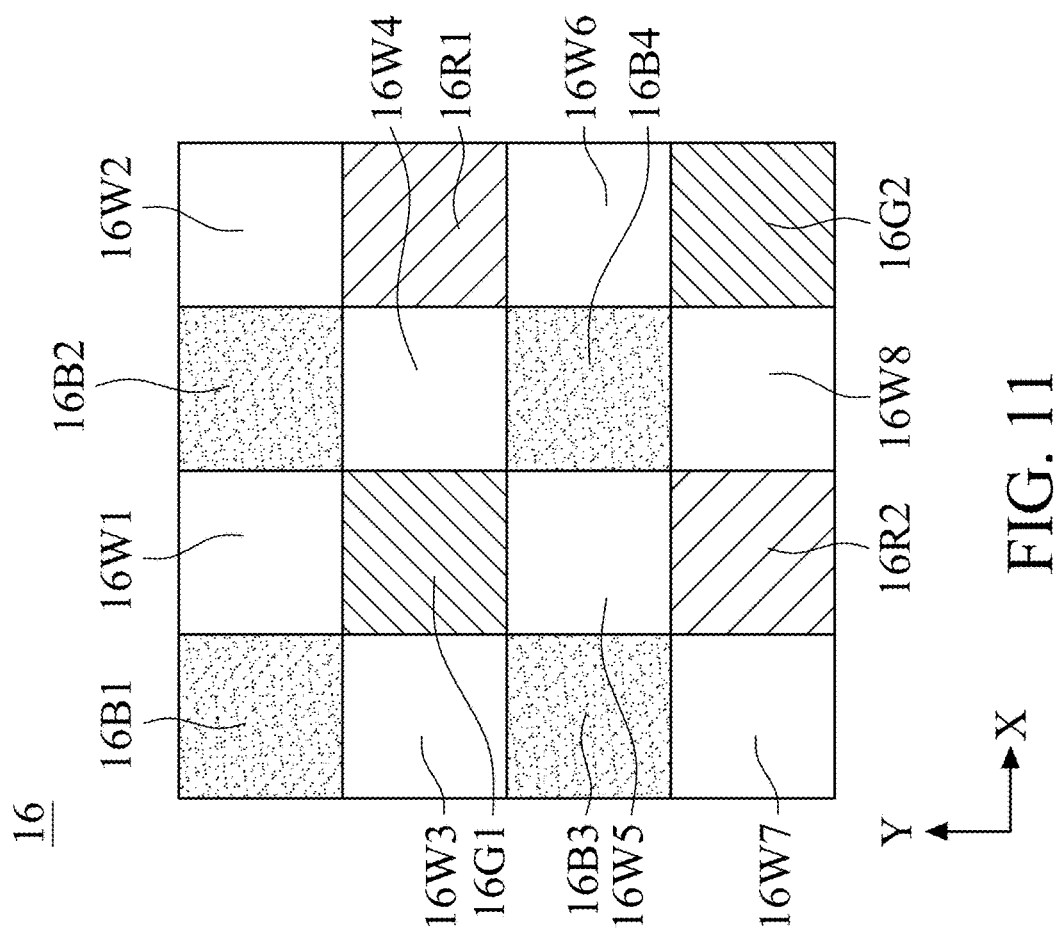
FIG. 11 is a partial top view illustrating the color filter layer according to some other embodiments of the present disclosure.

FIG. 11 is a partial top view illustrating the color filter layer 16 according to some other embodiments of the present disclosure. Similarly, the color filter layer 16 shown in FIG. 11 may replace the color filter layer 16 of FIG. 2 and be disposed in the solid-state image sensor 100 shown in FIG. 1 or the solid-state image sensor 102 shown in FIG. 4A. Moreover, the light-adjusting device 24 shown in FIG. 3D and FIG. 5F may correspond to the color filter layer 16 shown in FIG. 11.

Referring to FIG. 11, in some embodiments, four blue color filter segments 16B1, 16B2, 16B3, 16B4, two green color filter segments 16G1, 16G2, two red color filter segments 16R1, 16R2, and eight transparent segments 16W1, 16W2, 16W3, 16W4, 16W5, 16W6, 16W7, 16W8 form a 4×4 array. As shown in FIG. 11, in this embodiments, the color filter segments (blue color filter segments 16B1, 16B2, 16B3, 16B4, green color filter segments 16G1, 16G2, or red color filter segments 16R1, 16R2) and the transparent segments 16W1, 16W2, 16W3, 16W4, 16W5, 16W6, 16W7, 16W8 are staggered in X-direction and Y-direction that is perpendicular to X-direction.

Moreover, in this embodiment, each color filter segment is diagonally arranged with color filter segments of different color. For example, the green color filter segment 16G1 is diagonally arranged with the blue color filter segment 16B1, 16B2, 16B3, or 16B4, but the present disclosure is not limited thereto.

FIG. 12A is a partial top view illustrating the light-adjusting device 24 according to some embodiments of the present disclosure. The light-adjusting device 24 shown in FIG. 12A may be disposed on the spacer layer 22 shown in FIG. 4A and correspond to the color filter layer 16 shown in FIG. 4A and FIG. 11. Moreover, FIG. 12A further shows the corresponding blue color filter segments 16B1, 16B2, 16B3, 16B4, green color filter segments 16G1, 16G2, red color filter segments 16R1, 16R2, and transparent segments 16W1, 16W2, 16W3, 16W4, 16W5, 16W6, 16W7, 16W8.

As shown in FIG. 12A, in some embodiments, the groups of meta structures have different pillar arrangements. Moreover, in this embodiment, some pillars 24M correspond to the red color filter segments 16R1, 16R2. Furthermore, in this embodiment, the number of pillars 24M is different in each group of meta structures.

FIG. 12B is a partial top view illustrating the light-adjusting device 24 according to some embodiments of the present disclosure. As shown in FIG. 12B, the arrangement of the pillars 24M in each group of meta structures is similar to the arrangement of the pillars in each group of meta structures in FIG. 12A. In this embodiments, a central pillar 24H is disposed in the group of meta structure, and from a top view, the sectional area of the central pillar 24H is larger than the sectional area of other pillars 24M. Moreover, in this embodiments, the central pillars 24H correspond to the centers of the transparent segments 16W1, 16W2, 16W3, 16W4, 16W5, 16W6, 16W7, 16W8.

Figure 13:
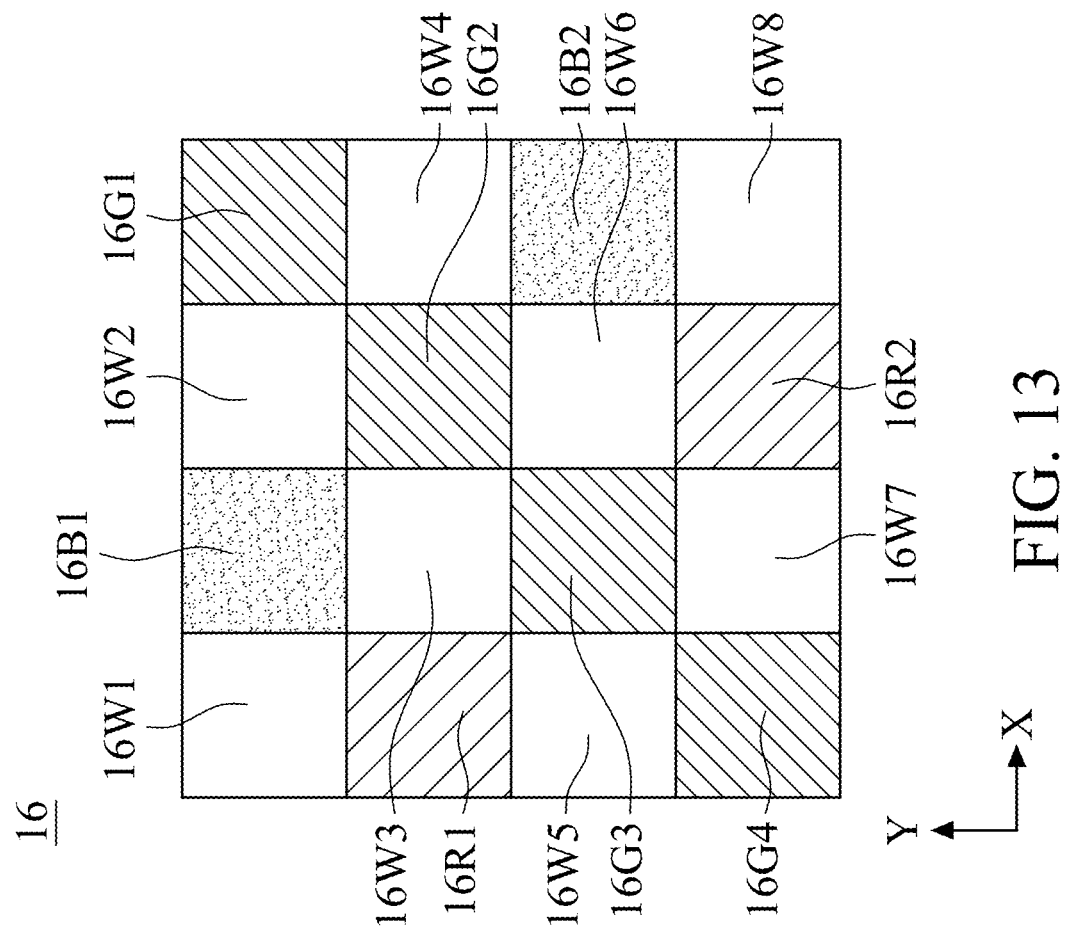
FIG. 13 is a partial top view illustrating the color filter layer according to some other embodiments of the present disclosure.

FIG. 13 is a partial top view illustrating the color filter layer 16 according to some other embodiments of the present disclosure. Similarly, the color filter layer 16 shown in FIG. 13 may replace the color filter layer 16 of FIG. 2 and be disposed in the solid-state image sensor 100 shown in FIG. 1 or the solid-state image sensor 102 shown in FIG. 4A. Moreover, the light-adjusting device 24 shown in FIG. 3D and FIG. 5F may correspond to the color filter layer 16 shown in FIG. 13.

Referring to FIG. 13, in some embodiments, two blue color filter segments 16B1, 16B2, four green color filter segments 16G1, 16G2, 16G3, 16G4, two red color filter segments 16R1, 16R2, and eight transparent segments 16W1, 16W2, 16W3, 16W4, 16W5, 16W6, 16W7, 16W8 form a 4×4 array. As shown in FIG. 13, in this embodiments, the color filter segments (blue color filter segments 16B1, 16B2, green color filter segments 16G1, 16G2, 16G3, 16G4, or red color filter segments 16R1, 16R2) and the transparent segments 16W1, 16W2, 16W3, 16W4, 16W5, 16W6, 16W7, 16W8 are staggered in X-direction and Y-direction that is perpendicular to X-direction.

Moreover, in this embodiment, the green filter segments 16G1, 16G2, 16G3, and 16G4 are arranged along a diagonal line, and other color filter segments (blue color filter segments 16B1, 16B2, and red color filter segments 16R1, 16R2) and the transparent segments 16W1, 16W2, 16W3, 16W4, 16W5, 16W6, 16W7, 16W8 are arranged symmetrically with the diagonal line as the axis of symmetry, but the present disclosure is not limited thereto.

Figures 14A, 14B:
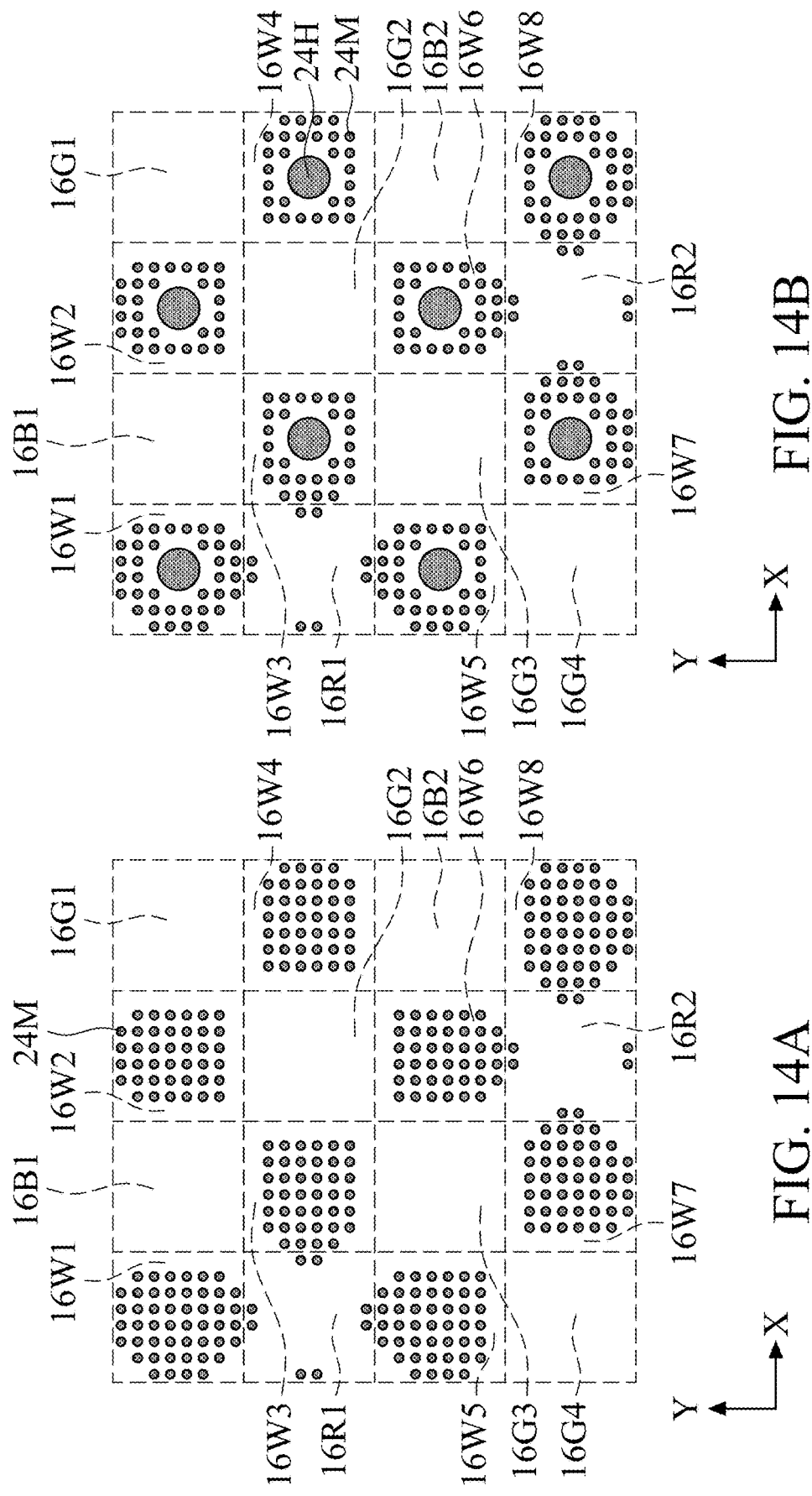
FIG. 14A is a partial top views illustrating the light-adjusting device according to some embodiments of the present disclosure.
FIG. 14B is a partial top view illustrating the light-adjusting device according to some embodiments of the present disclosure.

FIG. 14A is a partial top view illustrating the light-adjusting device 24 according to some embodiments of the present disclosure. The light-adjusting device 24 shown in FIG. 14A may be disposed on the spacer layer 22 shown in FIG. 4A and correspond to the color filter layer 16 shown in FIG. 4A and FIG. 13. Moreover, FIG. 14A further shows the corresponding blue color filter segments 16B1, 16B2, green color filter segments 16G1, 16G2, 16G3, 16G4, red color filter segments 16R1, 16R2, and transparent segments 16W1, 16W2, 16W3, 16W4, 16W5, 16W6, 16W7, 16W8.

As shown in FIG. 14A, in some embodiments, the groups of meta structures have different pillar arrangements. Moreover, in this embodiment, some pillars 24M correspond to the red color filter segments 16R1, 16R2. Furthermore, in this embodiment, the number of pillars 24M is different in each group of meta structures.

FIG. 14B is a partial top view illustrating the light-adjusting device 24 according to some embodiments of the present disclosure. As shown in FIG. 14B, the arrangement of the pillars 24M in each group of meta structures is similar to the arrangement of the pillars in each group of meta structures in FIG. 14A. In this embodiments, a central pillar 24H is disposed in the group of meta structure, and from a top view, the sectional area of the central pillar 24H is larger than the sectional area of other pillars 24M. Moreover, in this embodiments, the central pillars 24H correspond to the centers of the transparent segments 16W1, 16W2, 16W3, 16W4, 16W5, 16W6, 16W7, 16W8.

Figure 15:
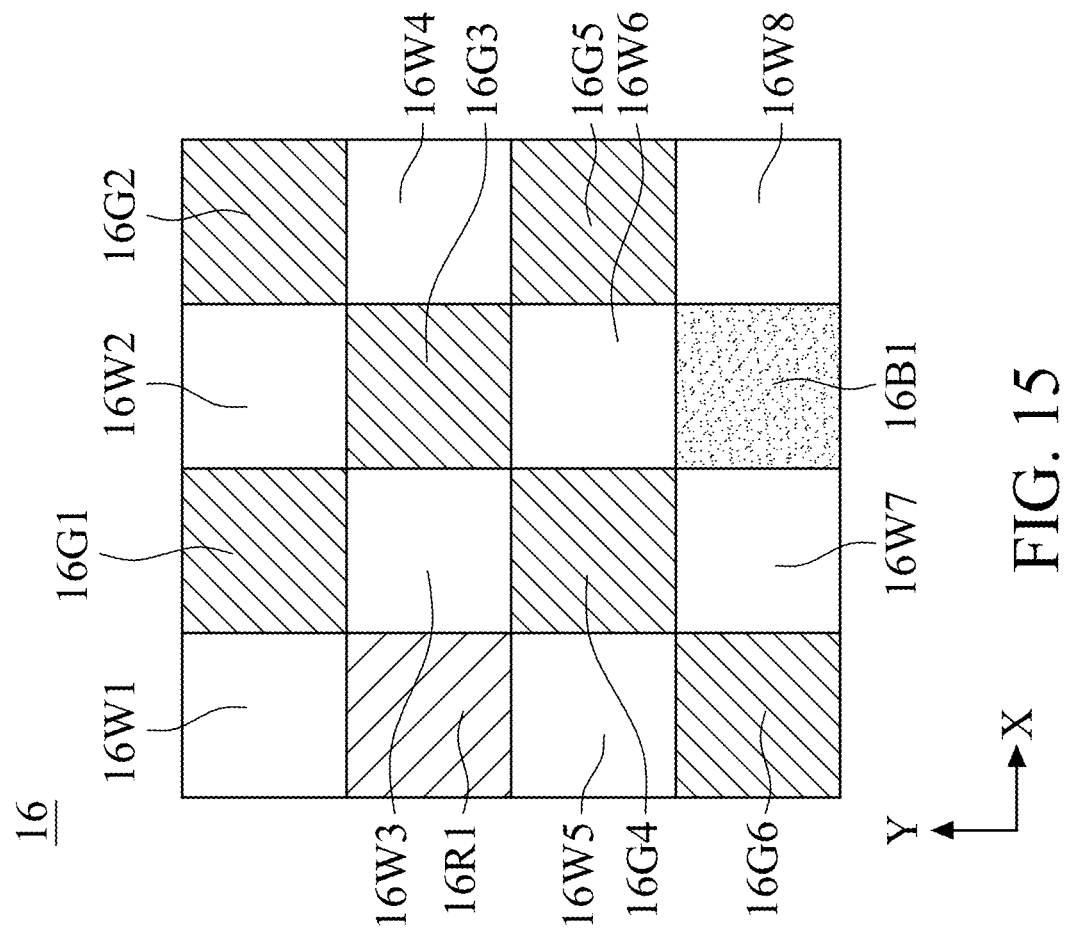
FIG. 15 is a partial top view illustrating the color filter layer according to some other embodiments of the present disclosure.

FIG. 15 is a partial top view illustrating the color filter layer 16 according to some other embodiments of the present disclosure. Similarly, the color filter layer 16 shown in FIG. 15 may replace the color filter layer 16 of FIG. 2 and be disposed in the solid-state image sensor 100 shown in FIG. 1 or the solid-state image sensor 102 shown in FIG. 4A. Moreover, the light-adjusting device 24 shown in FIG. 3D and FIG. 5F may correspond to the color filter layer 16 shown in FIG. 15.

Referring to FIG. 15, in some embodiments, one blue color filter segment 16B1, six green color filter segments 16G1, 16G2, 16G3, 16G4, 16G5, 16G6, one red color filter segment 16R1, and eight transparent segments 16W1, 16W2, 16W3, 16W4, 16W5, 16W6, 16W7, 16W8 form a 4×4 array. As shown in FIG. 15, in this embodiments, the color filter segments (blue color filter segment 16B1, green color filter segments 16G1, 16G2, 16G3, 16G4, 16G5, 16G6, or red color filter segment 16R1) and the transparent segments 16W1, 16W2, 16W3, 16W4, 16W5, 16W6, 16W7, 16W8 are staggered in X-direction and Y-direction that is perpendicular to X-direction.

Moreover, in this embodiment, the green filter segments 16G2, 16G3, 16G4, and 16G6 are arranged along a diagonal line, and other color filter segments (blue color filter segment 16B1, green color filter segments 16G1, 16G5, and red color filter segment 16R1) and the transparent segments 16W1, 16W2, 16W3, 16W4, 16W5, 16W6, 16W7, 16W8 are arranged symmetrically with the diagonal line as the axis of symmetry, but the present disclosure is not limited thereto.

Figures 16A, 16B:
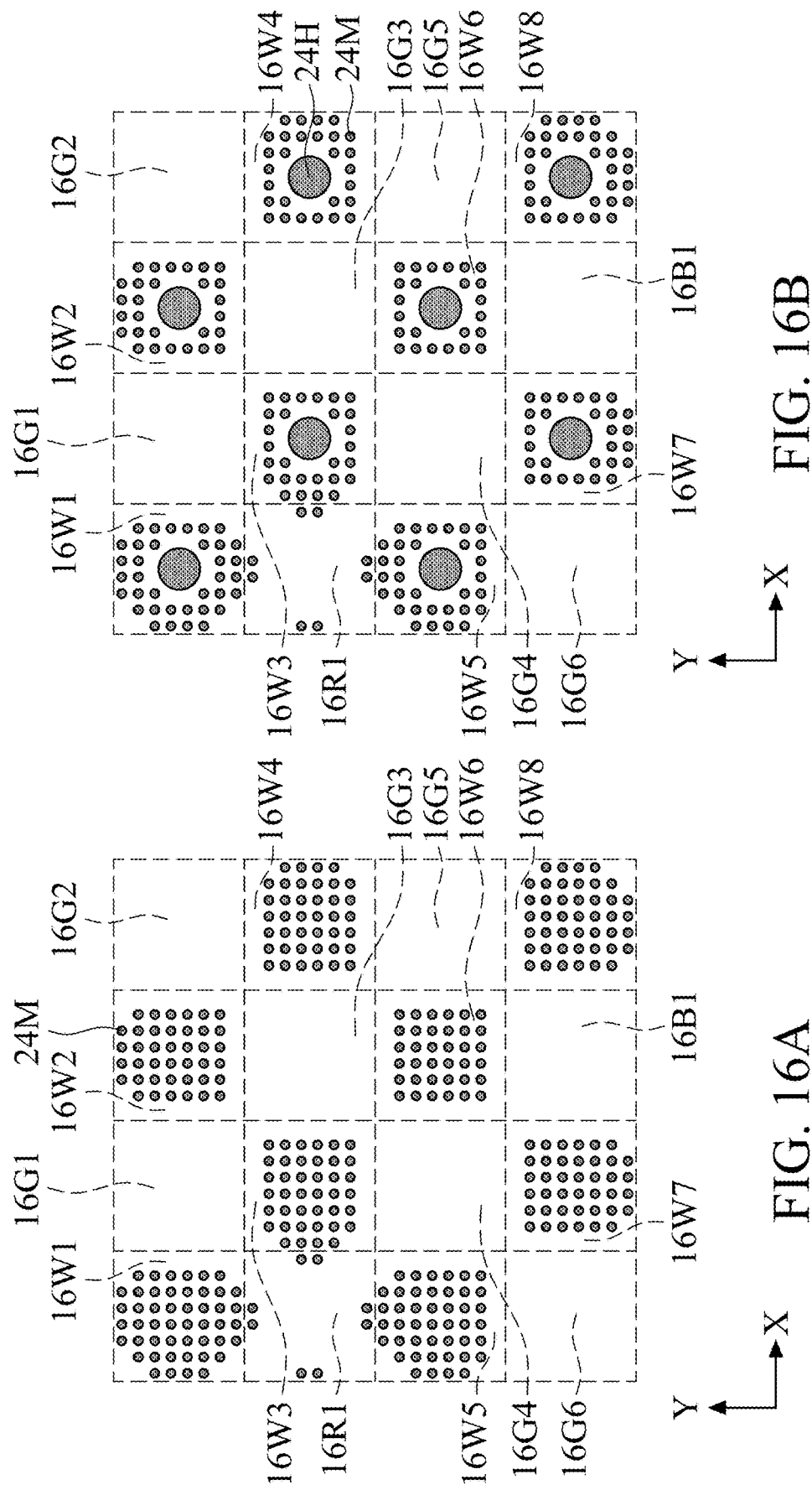
FIG. 16A is a partial top view illustrating the light-adjusting device according to some embodiments of the present disclosure.
FIG. 16B is a partial top view illustrating the light-adjusting device according to some embodiments of the present disclosure.

FIG. 16A is a partial top view illustrating the light-adjusting device 24 according to some embodiments of the present disclosure. The light-adjusting device 24 shown in FIG. 16A may be disposed on the spacer layer 22 shown in FIG. 4A and correspond to the color filter layer 16 shown in FIG. 4A and FIG. 15. Moreover, FIG. 16A further shows the corresponding blue color filter segment 16B1, green color filter segments 16G1, 16G2, 16G3, 16G4, 16G5, 16G6, red color filter segment 16R1, and transparent segments 16W1, 16W2, 16W3, 16W4, 16W5, 16W6, 16W7, 16W8.

As shown in FIG. 16A, in some embodiments, the groups of meta structures have different pillar arrangements. Moreover, in this embodiment, some pillars 24M correspond to the red color filter segment 16R1. Furthermore, in this embodiment, the number of pillars 24M is different in each group of meta structures.

FIG. 16B is a partial top view illustrating the light-adjusting device 24 according to some embodiments of the present disclosure. As shown in FIG. 16B, the arrangement of the pillars 24M in each group of meta structures is similar to the arrangement of the pillars in each group of meta structures in FIG. 16A. In this embodiments, a central pillar 24H is disposed in the group of meta structure, and from a top view, the sectional area of the central pillar 24H is larger than the sectional area of other pillars 24M. Moreover, in this embodiments, the central pillars 24H correspond to the centers of the transparent segments 16W1, 16W2, 16W3, 16W4, 16W5, 16W6, 16W7, 16W8.

Figure 17:
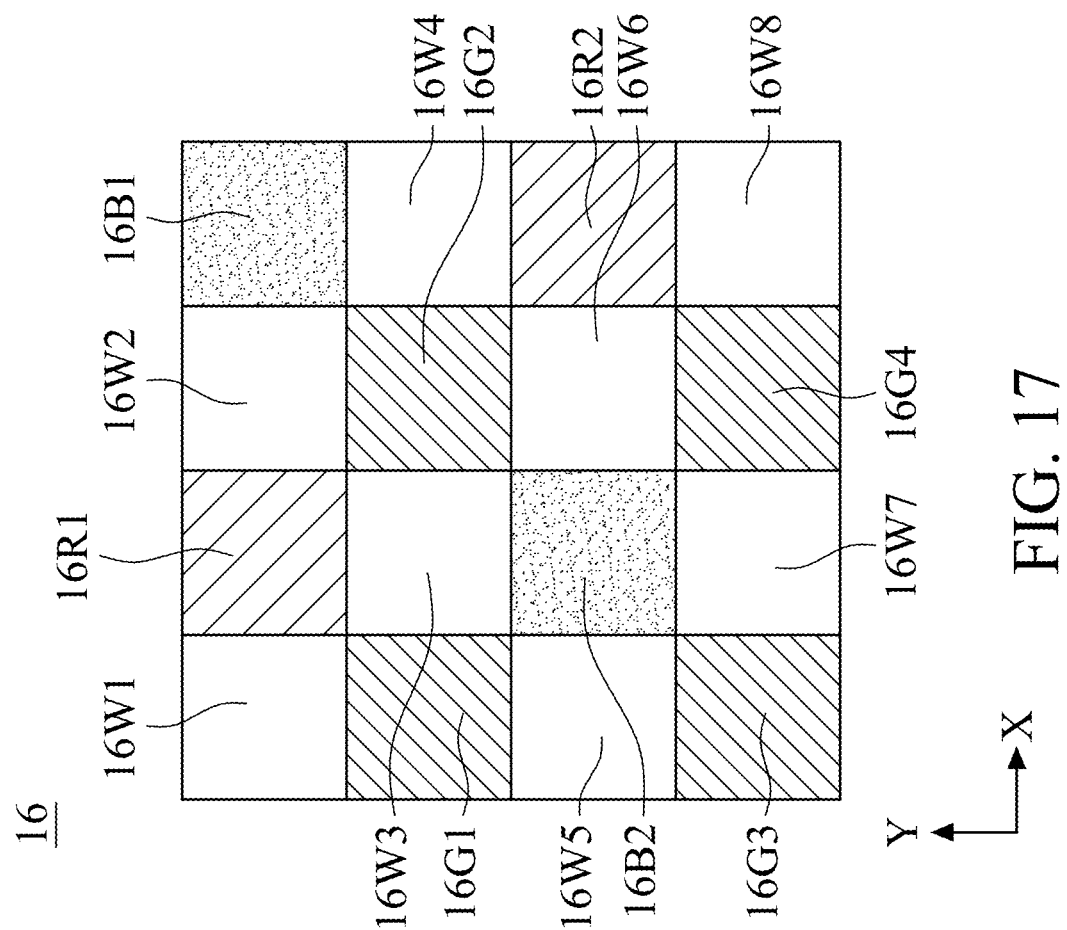
FIG. 17 is a partial top view illustrating the color filter layer according to some other embodiments of the present disclosure.

FIG. 17 is a partial top view illustrating the color filter layer 16 according to some other embodiments of the present disclosure. Similarly, the color filter layer 16 shown in FIG. 17 may replace the color filter layer 16 of FIG. 2 and be disposed in the solid-state image sensor 100 shown in FIG. 1 or the solid-state image sensor 102 shown in FIG. 4A. Moreover, the light-adjusting device 24 shown in FIG. 3D and FIG. 5F may correspond to the color filter layer 16 shown in FIG. 17.

Referring to FIG. 17, in some embodiments, two blue color filter segments 16B1, 16B2, four green color filter segments 16G1, 16G2, 16G3, 16G4, two red color filter segments 16R1, 16R2, and eight transparent segments 16W1, 16W2, 16W3, 16W4, 16W5, 16W6, 16W7, 16W8 form a 4×4 array. As shown in FIG. 17, in this embodiments, the color filter segments (blue color filter segments 16B1, 16B2, green color filter segments 16G1, 16G2, 16G3, 16G4, or red color filter segments 16R1, 16R2) and the transparent segments 16W1, 16W2, 16W3, 16W4, 16W5, 16W6, 16W7, 16W8 are staggered in X-direction and Y-direction that is perpendicular to X-direction.

Moreover, in this embodiment, each color filter segment is diagonally arranged with color filter segments of different color. For example, the blue color filter segment 16B2 is diagonally arranged with the green color filter segment 16G1, 16G2, 16G3, or 16G4, but the present disclosure is not limited thereto.

Figures 18A, 18B:
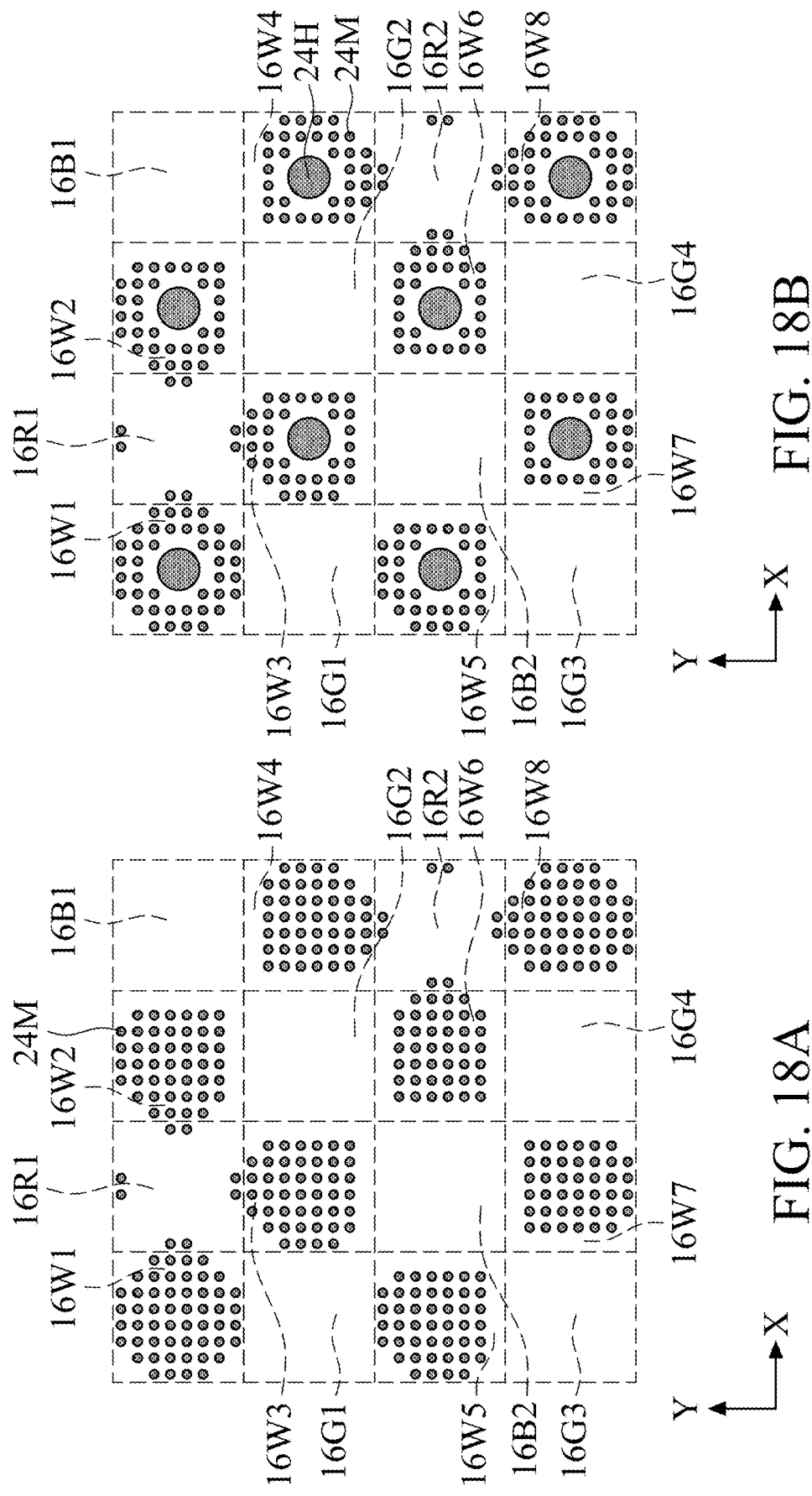
FIG. 18A is a partial top view illustrating the light-adjusting device according to some embodiments of the present disclosure.
FIG. 18B is a partial top view illustrating the light-adjusting device according to some embodiments of the present disclosure.

FIG. 18A is a partial top view illustrating the light-adjusting device 24 according to some embodiments of the present disclosure. The light-adjusting device 24 shown in FIG. 18A may be disposed on the spacer layer 22 shown in FIG. 4A and correspond to the color filter layer 16 shown in FIG. 4A and FIG. 17. Moreover, FIG. 18A further shows the corresponding blue color filter segments 16B1, 16B2, green color filter segments 16G1, 16G2, 16G3, 16G4, red color filter segments 16R1, 16R2, and transparent segments 16W1, 16W2, 16W3, 16W4, 16W5, 16W6, 16W7, 16W8.

As shown in FIG. 18A, in some embodiments, the groups of meta structures have different pillar arrangements. Moreover, in this embodiment, some pillars 24M correspond to the red color filter segments 16R1, 16R2. Furthermore, in this embodiment, the number of pillars 24M is different in each group of meta structures.

FIG. 18B is a partial top view illustrating the light-adjusting device 24 according to some embodiments of the present disclosure. As shown in FIG. 18B, the arrangement of the pillars 24M in each group of meta structures is similar to the arrangement of the pillars in each group of meta structures in FIG. 18A. In this embodiments, a central pillar 24H is disposed in the group of meta structure, and from a top view, the sectional area of the central pillar 24H is larger than the sectional area of other pillars 24M. Moreover, in this embodiments, the central pillars 24H correspond to the centers of the transparent segments 16W1, 16W2, 16W3, 16W4, 16W5, 16W6, 16W7, 16W8.

Figure 19:
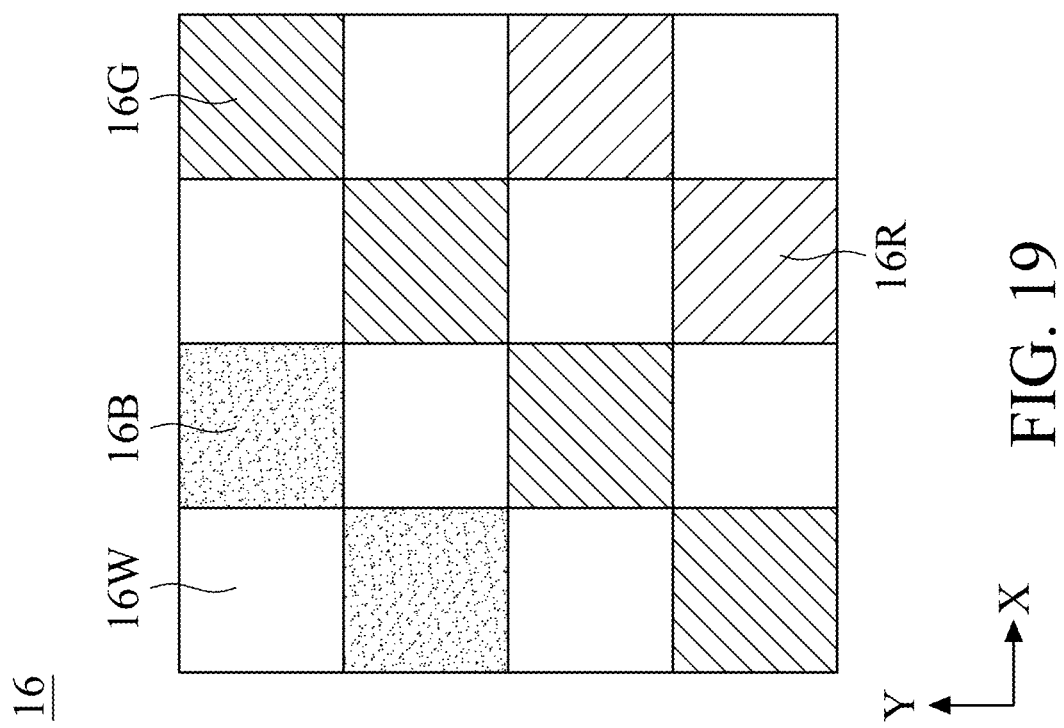
FIG. 19 is a partial top view illustrating the color filter layer according to some other embodiments of the present disclosure.

FIG. 19 is a partial top view illustrating the color filter layer 16 according to some other embodiments of the present disclosure. Similarly, the color filter layer 16 shown in FIG. 19 may replace the color filter layer 16 of FIG. 2 and be disposed in the solid-state image sensor 100 shown in FIG. 1 or the solid-state image sensor 102 shown in FIG. 4A. Moreover, the light-adjusting device 24 shown in FIG. 3D and FIG. 5F may correspond to the color filter layer 16 shown in FIG. 19.

Referring to FIG. 19, in some embodiments, two blue color filter segments 16B, four green color filter segments 16G, two red color filter segments 16R, and eight transparent segments 16W form a 4×4 array. As shown in FIG. 19, in this embodiments, the color filter segments (blue color filter segments 16B, green color filter segments 16G, or red color filter segments 16R) and the transparent segments 16W are staggered in X-direction and Y-direction that is perpendicular to X-direction.

Moreover, in this embodiment, the green filter segments 16G are arranged along a diagonal line, and other color filter segments (blue color filter segments 16B, and red color filter segments 16R) and the transparent segments 16W are arranged symmetrically with the diagonal line as the axis of symmetry. Furthermore, two blue color filter segments 16B are diagonally arranged, and two red color filter segments 16R are diagonally arranged, but the present disclosure is not limited thereto.

Figures 20A, 20B:
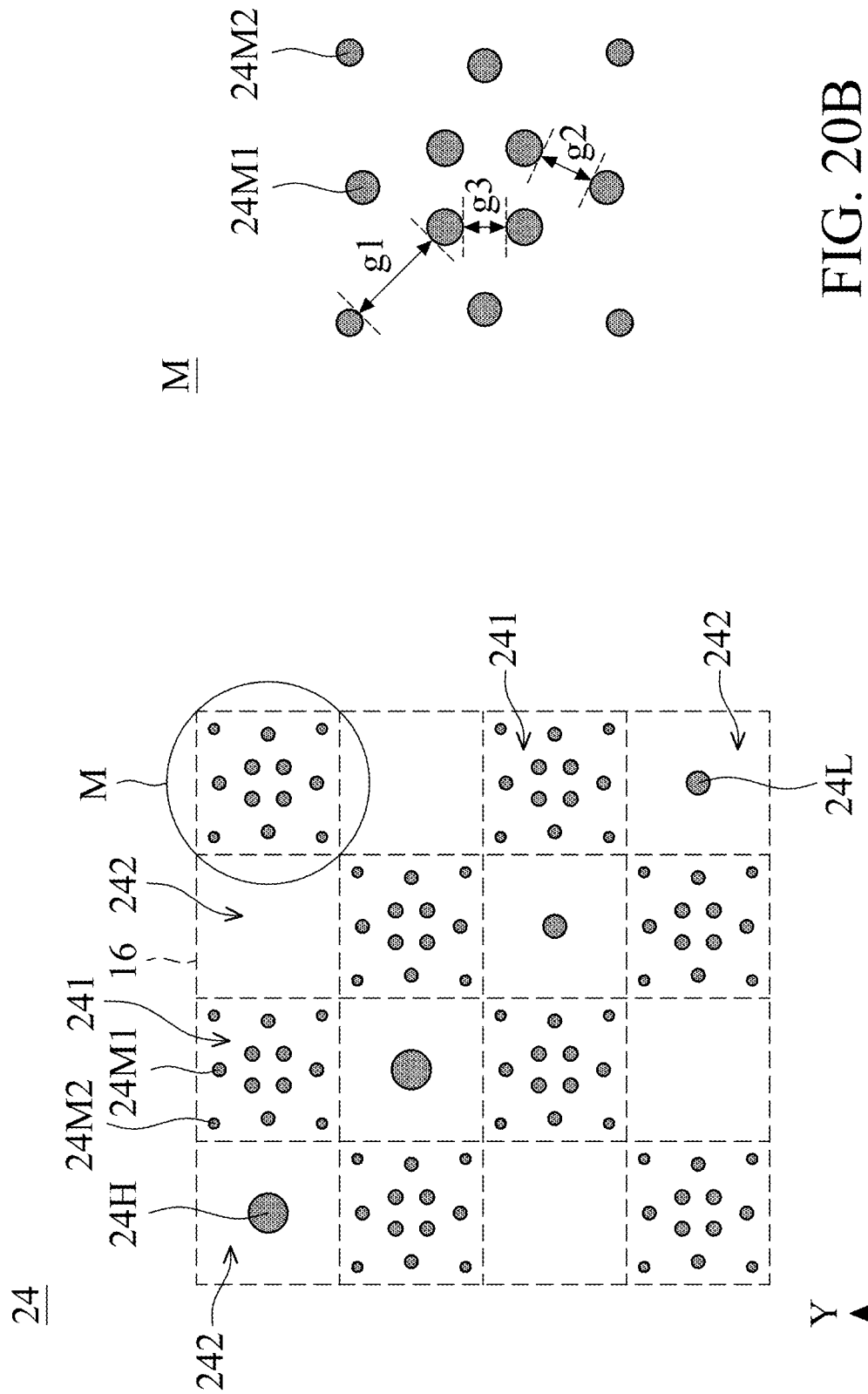
FIG. 20A is a partial top view illustrating the light-adjusting device according to some embodiments of the present disclosure.
FIG. 20B is an enlarged view of the group of meta structures in FIG. 20A.
Figure 20C:
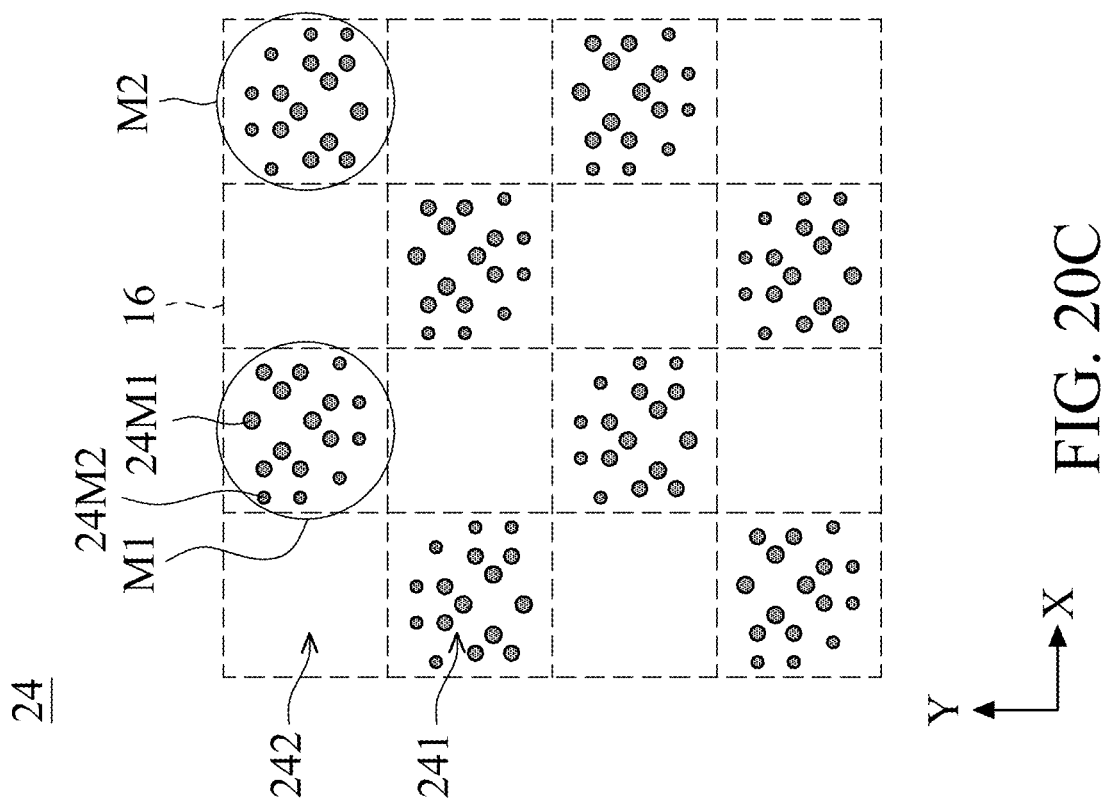
FIG. 20C is a partial top view illustrating the light-adjusting device according to some other embodiments of the present disclosure.

FIG. 20A is a partial top view illustrating the light-adjusting device 24 according to some embodiments of the present disclosure. FIG. 20B is an enlarged view of the group of meta structures M in FIG. 20A. FIG. 20C is a partial top view illustrating the light-adjusting device 24 according to some other embodiments of the present disclosure. The light-adjusting device 24 shown in FIG. 20A and FIG. 20C may be disposed on the spacer layer 22 shown in FIG. 1 and correspond to the color filter layer 16 shown in FIG. 1 and FIG. 19.

In some embodiments, the distance between two adjacent pillars in one group of meta structures M is variable. For example, as shown in FIG. 20A and FIG. 20B, the distance g1 between one pillar 24M1 and the closest pillar 24M2 is greater than the distance g2 (or g3) between two adjacent pillars 24M1. Moreover, the distance g2 between two adjacent pillars 24M1, and the distance g3 between other two adjacent pillars 24M1 are different. Furthermore, in this embodiment, some pillars 24H, 24L correspond to the second regions 242 of the light-adjusting device 24, and the second regions 242 of the light-adjusting device 24 correspond to the transparent segments 16W.

As shown in FIG. 20C, in this embodiment, the groups of meta structures M1 and M2 have different pillar arrangements. Moreover, the number of pillars in the groups of meta structures M1 and M2 are different.

In summary, the solid-state image sensor according to the present disclosure includes a light-adjusting device that includes first regions and second regions arranged in a checkerboard pattern, which may split or collect incident light for enhancing the energy into the transparent region, thereby effectively improving quantum efficiency in IR/NIR region. Furthermore, the quality of the color performance may also be improved, thereby improving the quality of the image signal from the photoelectric conversion elements of the solid-state image sensors.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A light-adjusting device having first regions and second regions, comprising:
    pillars forming several groups of meta structures;
    wherein the groups of meta structures correspond to the first regions, and from a top view, the second regions are free of the groups of meta structures at a center, crossing points of boundaries that divide the first regions and the second regions are free of the groups of meta structures, and the first regions and the second regions are arranged in a checkerboard pattern.

2. The light-adjusting device as claimed in claim 1, wherein a number of pillars is different in each of the groups of meta structures.

3. The light-adjusting device as claimed in claim 1, wherein the pillars are divided into first pillars and second pillars, and from a top view, a sectional area of each of the first pillars is larger than a sectional area of each of the second pillars.

4. The light-adjusting device as claimed in claim 3, wherein in one of the groups of meta structures, one of the first pillars and a closest one of the second pillars define a first period, adjacent two of the second pillars define a second period, and the first period is greater than the second period.

5. The light-adjusting device as claimed in claim 1, wherein some of the pillars correspond to the second regions.

6. The light-adjusting device as claimed in claim 1, wherein the first regions and the second regions are staggered in a first direction.

7. The light-adjusting device as claimed in claim 6, wherein the first regions and the second regions are staggered in a second direction that is perpendicular to the first direction.

8. The light-adjusting device as claimed in claim 6, wherein the first regions are adjacent to each other along a second direction that is perpendicular to the first direction, and the second regions are adjacent to each other along the second direction.

9. The light-adjusting device as claimed in claim 1, wherein a distance between adjacent two of the pillars in one of the groups of meta structures is variable.

10. A solid-state image sensor, comprising:
photoelectric conversion elements;
a color filter layer disposed above the photoelectric conversion elements, wherein the color filter layer comprises color filter segments and transparent segments;
condensing structures disposed above the color filter layer; and
a light-adjusting device disposed above the condensing structures, wherein the light-adjusting device has first regions and second regions and comprises:
pillars forming several groups of meta structures,
wherein the groups of meta structures correspond to the first regions, and from a top view, the second regions are free of the groups of meta structures at a center, crossing points of boundaries that divide the first regions and the second regions are free of the groups of meta structures, and the first regions and the second regions are arranged in a checkerboard pattern.

11. The solid-state image sensor as claimed in claim 10, wherein the first regions are disposed on the color filter segments.

12. The solid-state image sensor as claimed in claim 10, wherein the first regions are disposed on the transparent segments.

13. The solid-state image sensor as claimed in claim 12, wherein some of the pillars correspond to the color filter segments.

14. The solid-state image sensor as claimed in claim 12, wherein the color filter segments comprise red color filter segments, green color filter segments, and blue color filter segments, and some of the pillars correspond to the red color filter segments.

15. The solid-state image sensor as claimed in claim 14, wherein the pillars form first groups of meta structures, second groups of meta structures, and third groups of meta structures that have different sizes of taper-adjacent-rectangular arrangement, and one of the second regions that corresponds to one of the blue color filter segments is surrounded by two of the first groups of meta structures, one of the second groups of meta structures, and one of the third groups of meta structures.

16. The solid-state image sensor as claimed in claim 10, wherein the color filter segments and the transparent segments are staggered in a first direction.

17. The solid-state image sensor as claimed in claim 16, wherein the color filter segments and the transparent segments are staggered in a second direction that is perpendicular to the first direction.

18. The solid-state image sensor as claimed in claim 16, wherein the color filter segments are adjacent to each other along a second direction that is perpendicular to the first direction, and the transparent segments are adjacent to each other along the second direction.

19. The solid-state image sensor as claimed in claim 10, wherein the pillars comprise a central pillar in one of the groups of meta structures, and from a top view, a sectional area of the central pillar is larger than a sectional area of other pillars, and the central pillar corresponds to a center of one of the color filter segments or the transparent segments.

20. The solid-state image sensor as claimed in claim 10, wherein a shortest distance between the condensing structures and the light-adjusting device is greater than a thickness of the light-adjusting device and a thickness of the condensing structures.

* * * * *